United States Patent
Slot

(10) Patent No.: US 9,353,727 B2
(45) Date of Patent: May 31, 2016

(54) METHOD OF IN SITU CALIBRATING LOAD SENSORS OF A WIND TURBINE BLADE

(75) Inventor: Mark Olaf Slot, Bryrup (DK)

(73) Assignee: LM GLASFIBER A/S, Kolding (DK)

( * ) Notice: Subject to any disclaimer, the term of this patent is extended or adjusted under 35 U.S.C. 154(b) by 590 days.

(21) Appl. No.: 13/576,235

(22) PCT Filed: Jan. 31, 2011

(86) PCT No.: PCT/EP2011/000422
§ 371 (c)(1),
(2), (4) Date: Jul. 31, 2012

(87) PCT Pub. No.: WO2011/092032
PCT Pub. Date: Aug. 4, 2011

(65) Prior Publication Data
US 2012/0292905 A1    Nov. 22, 2012

(30) Foreign Application Priority Data
Feb. 1, 2010 (EP) .................................... 10000974

(51) Int. Cl.
*F03D 11/00* (2006.01)
*F03D 1/06* (2006.01)

(52) U.S. Cl.
CPC ............ *F03D 1/065* (2013.01); *F03D 11/0091* (2013.01); *F05B 2270/326* (2013.01); *F05B 2270/328* (2013.01); *F05B 2270/331* (2013.01); *F05B 2270/802* (2013.01); *F05B 2270/803* (2013.01); *Y02E 10/721* (2013.01); *Y02E 10/722* (2013.01)

(58) Field of Classification Search
CPC .. F03D 11/0091; F05B 22/327; F05B 22/328; F05B 22/329; F05B 22/331
USPC ..................................... 416/61, 1; 290/44, 55
See application file for complete search history.

(56) References Cited

U.S. PATENT DOCUMENTS

2004/0057828 A1    3/2004    Bosche
2008/0118342 A1*   5/2008    Seidel et al. ...................... 415/1
(Continued)

FOREIGN PATENT DOCUMENTS

DE            197 39 164 A1    3/1999
DE       10 2006 036 157 A1    2/2008
(Continued)

*Primary Examiner* — Ninh H Nguyen
(74) *Attorney, Agent, or Firm* — Nath, Goldberg & Meyer; Jerald L. Meyer; Tanya E. Harkins

(57) ABSTRACT

A method of in situ calibrating load sensors of a horizontal axis wind turbine is described. The method comprises the steps of: a) determining a rotor azimuth angle of a first wind turbine blade, b) determining a pitch angle of the first wind turbine blade, c) measuring loads in a first cross-section of the first wind turbine blade using the first load sensors, d) calculating theoretical loads based on at least the rotor azimuth angle and the pitch angle of the blade determined in steps a) and b), e) comparing the loads measured in step c) with the theoretical loads calculated in step d), and f) calibrating the first load sensors based on the comparison of step e), wherein the calibration are based only on measurements carried out, when the generator is cut out.

18 Claims, 11 Drawing Sheets

(56) References Cited

U.S. PATENT DOCUMENTS

| | | |
|---|---|---|
| 2009/0129924 A1* | 5/2009 | Rebsdorf et al. ............ 416/43 |
| 2009/0169357 A1* | 7/2009 | Slack ............................ 415/26 |
| 2009/0246019 A1* | 10/2009 | Volanthen et al. ............ 416/1 |
| 2009/0257873 A1* | 10/2009 | Egedal et al. ................. 416/1 |
| 2009/0263246 A1* | 10/2009 | Bolz ............................. 416/61 |
| 2010/0310373 A1* | 12/2010 | Castell Martinez .......... 416/61 |

FOREIGN PATENT DOCUMENTS

| | | |
|---|---|---|
| EP | 1 359 321 A1 | 11/2003 |
| EP | 2 075 561 A2 | 7/2009 |
| EP | 2 112 375 A2 | 10/2009 |

* cited by examiner

METHOD OF IN SITU CALIBRATING LOAD SENSORS OF A WIND TURBINE BLADE

This is a National Phase Application filed under 35 U.S.C. §371 as a national stage of International Application No. PCT/EP2011/000422, filed Jan. 31, 2011, claiming the benefit from European Application No. 10000974.5, filed Feb. 1, 2010, the entire content of each of which is hereby incorporated by reference in its entirety.

TECHNICAL FIELD

The present invention relates to a method of in situ calibrating load sensors of a horizontal axis wind turbine, the wind turbine comprising: a rotor including a hub and a number of wind turbine blades, which extend radially from the hub, the hub being connected to a drive train including a generator, which converts mechanical rotational motion of the rotor into electrical energy, wherein said number of blades comprises at least a first wind turbine blade provided with a number of first load sensors positioned in a first cross-section of the first wind turbine blade.

New wind turbine blades are increasingly often equipped with load sensors used for control purposes and/or monitoring.

BACKGROUND

WO08135789 and EP2112375 from the same patent family disclose a method of detecting formation of ice on the blades of a wind turbine, wherein the blades are provided with fibre strain sensors for measuring mechanical strain of the wind turbine blades. The documents describe that the fibre strain sensor may be calibrated by use of a separate calibration procedure, wherein the pitch angle are positioned so that maximum component of the blade weight acts on flapwise and edgewise sensors, respectively. The rotor of the wind turbine is then rotated at a constant speed in order to minimise aerodynamic and centrifugal forces and with no electrical load on the generator of the wind turbine. The calibration procedure is carried out with the blades in a fixed pitch position for several revolutions of the wind turbine rotor. A sinusoidal signal can be extracted from the data using a bandpass filter locked to the rotational frequency of the wind turbine.

WO08020239 and WO08020240 describe a method of manufacturing a wind turbine with a number of wind turbine blades provided with optical fibre Bragg grating sensors.

WO09056869 describes a method of monitoring strain on a wind turbine blade, wherein at least three strain sensors are located on one of the structural components of the wind turbine blade in a transverse plane thereof, wherein strain signals from the strain sensors are resolved into strain measurements in two orthogonal directions.

DE102006036157 discloses a method of calibrating a sensor of a wind turbine. The calibration is carried out in a separate process once an initiation signal has been sent. The calibration is carried out by positioning the rotor in a brake position with a blade in a horizontal position and letting the blade run through a pitch cycle, after which the data signal from the sensor is analysed. Alternatively, the blade is maintained at a fixed pitch angle while data is collected for several rotations of the rotor.

In order to obtain reliable measurements, the load sensors must be calibrated. This can be done in the factory, but is relatively costly. If for some reason the load sensors need to be re-calibrated after some operation on the turbine, it would be very expensive to dismount the blades and carry them to the factory for calibration, which is especially apparent for off-shore wind turbines. Therefore, there is a demand for a possibility of calibrating the sensors on-site and preferably while the blade is mounted on the wind turbine and more preferably during normal operation of the wind turbine.

DISCLOSURE OF THE INVENTION

It is an object of the invention to obtain a new method, which overcomes or ameliorates at least one of the disadvantages of the prior art or which provides a useful alternative.

According to a first aspect of the invention, the object is obtained by the method comprising the steps of: a) determining a rotor azimuth angle, b) determining a pitch angle of the first wind turbine blade, c) measuring loads in the first cross-section of the first wind turbine blade using the first load sensors, d) calculating theoretical loads based on at least the rotor azimuth angle and the pitch angle of the blade determined in steps a) and b), e) comparing the loads measured in step c) with the theoretical loads calculated in step d), and f) calibrating the first load sensors based on the comparison of step e), wherein the calibration is based only on measurements carried out, when the generator is cut out, and wherein values collected in steps a)-d) are repeatedly sampled and calculated for each sample.

The advantage of the present concept is that it is possible to calibrate the sensors on-site while the blades are mounted on the turbine, i.e. without needing to dismount the blades from the turbine. The calibration may be performed while the turbine is running and connected to the grid. A system is continuously logging the relevant data (turbine operating conditions and sensor measurements), and after some time it has collected enough data to be able to do a reliable calibration of the sensors. The calibration is done fully automatic. There is no special calibration procedure, i.e. there is no requirement for human interaction or carrying out special maneuvers with the turbine. All data are collected during normal operation of the turbine. However, most of the useful data will be collected mainly in situations where the turbine is idling at low wind speeds and during startup of the turbine. These operational situations occur relatively often, so it is just a matter of time before the system has collected enough data to do the calibration. When the system is continuously re-calibrating the sensors, it is possible to detect sudden changes in the calibration values that could indicate changes in the bending stiffness. This could reveal aging or a possible damage of the blade.

By calculating a theoretical load for each sample based on both the rotor azimuth angle and the pitch angle of the blade, the need for keeping one of the two parameters fixed is alleviated, and both parameters may change between samples. Compared to for instance EP2112375 and DE102006036157, this means that the calibration of the sensors can be carried out continuously and does not have to go through a special calibration process. Calibration samples may instead be automatically collected when the wind turbine conditions are within given parameters. Also, the auto calibration method according to the present invention may be carried out more precisely, since each sample is compared to a separately calculated theoretical load, in which multiple parameters may be taken into account. The prior art calibration methods instead rely on simplified conditions, where a sinusoidal data can be extracted from pitch cycles or rotor cycles. Such data will seldomly be true sinusoidal in practice.

The term "cut out" means that the generator is not connected to the grid and thus not converting rotor rotation into electricity, i.e. the main shaft torque is approximately zero. This further implies that also the emergency brake is not activated.

According to an advantageous embodiment, only measurements carried out when the wind turbine is idling and/or during startup of the turbine are used for calibrating the load sensors. In other words, the remainder of the measurement data is discarded from the calibration process.

According to another advantageous embodiment, the wind turbine comprises two or three wind turbine blades. The calibration process may be carried out for each wind turbine blade.

According to yet another advantageous embodiment, values determined in steps a)-d) and optionally step e) are repeatedly sampled, and wherein step f) is carried out after a predetermined period of time or after a predetermined number of distinct samples have been logged, alternatively that a number of distinct samples exceeds a minimum threshold value, which is determined by a function depending on sampling frequency and spread of data.

In one embodiment, the wind turbine further comprises brakes for braking rotation of the rotor, and wherein only measurements carried out when the brakes are not engaged are used for calibrating the load sensors. That is, if the brakes are engaged, the measurement data are discarded from the calibration process.

In one advantageous embodiment, the first cross-section comprises at least two load sensors. Thereby, it is possible to deduct flapwise and edgewise bending moments by superposition, even if the two sensors are not located on the exact bending axes. The at least two load sensors may comprise a first load sensor located near a trailing edge of the first wind turbine blade, and a second load sensor located between a leading edge and the trailing edge of the first wind turbine at a suction side or a pressure side of the first wind turbine blade. This provides an advantageous embodiment, where the first load sensor and the second load sensor are located near the first principal bending axis and the second principal bending axis of the blade, respectively. According to another embodiment the one or both of the at least two load sensors are located on principal bending axes of the blade.

According to another embodiment, the first wind turbine blade further is provided with a number of second load sensors positioned in a second cross-section of the first wind turbine blade. The same calibration steps as performed for the calibration of the first load sensors should be carried out for the calibration of the second load sensors as well. The first wind turbine may comprise load sensors only in 1 to 5 different cross-sections, advantageously only 1 to 4 different cross sections, and more advantageously only 1 to 3 different cross-sections. The first wind turbine blade may even comprise load sensors in only 1-2 different cross-sections. Thus, measurements and calibration are carried out only for a small number of load sensors, which overall reduces the computational complexity of the system.

According to one advantageous embodiment, the calculations of step d) are based on gravitational forces and/or gravitational moments from an own weight of the first wind turbine blade. The calculations may advantageously be carried out via coordinate transformations based on one or more of the following parameters: a tilt of a main bearing of the drive train, the rotor azimuth angle, the pitch angle of the first blade, and a coning angle of the first blade. Additionally, a coordinate transformation based on an angle between a blade coordinate system and a principal bending axis may be used.

According to another advantageous embodiment, the calculations of step d) are further based on inertia forces and/or inertia moments from rotation of the rotor. Such additional factors add further precision to the calibration process. The inertia forces may advantageously be based on centrifugal forces and/or Coriolis forces and/or forces due to rotor acceleration. In addition, it may be possible to add inertia forces due to yawing of the wind turbine to the calculations. This adds even further precision to the calibration process.

According to yet another embodiment, the calculations of step d) are further based on aerodynamic forces and/or aerodynamic moments from rotation of the rotor and/or from wind impacting the first wind turbine blade. Such forces tend to accelerate the rotor. Again, such factors add even further precision to the calibration method.

Even more, the calculations of step d) may advantageously further be based on general properties of the first wind turbine blade and a part of the first wind turbine blade located at outboard of the first cross-section. Thus, the outboard part comprises the part of the blade located between the first cross-section and the blade tip. The general properties may be based on one or more of the following parameters: mass, mass moment, moment of inertia and product of inertia. Once these general properties are calculated, the rest of the calculations can be executed linearly and are much less time-consuming, because the iteration through all the blade sections are avoided. This innovative approach enables a real time calculation without requiring excessive computational capacity. This means that the measurements can be processed immediately after each sample, and the calibration can run continuously, i.e. in real-time.

In one embodiment, the calculations of step d) are further based on frictional losses from the drive train. Again, such considerations add even further precision to the calibration process.

According to an advantageous embodiment, the measurement data are filtered according to one or more of the following schemes. It is for instance possible to discard measurement data obtained when a rotor speed of the rotor exceeds a generator cut-in speed from the calibration process, alternatively that a threshold is used for filtering of data, when the generator is cut-in and/or a rotor speed exceeds a rotor speed threshold, in order to avoid uncertainties due to aerodynamic forces. Measurements obtained for rotor speeds above this threshold are thus disregarded. Measurement data obtained when a rotor deceleration of the rotor exceeds a rotor deceleration threshold may also be discarded from the calibration process. Furthermore, measurement data obtained when an absolute rotor speed of the rotor is lower than a minimum rotor speed threshold may be discarded from the calibration process. Also, measurement data obtained when the pitch of the first wind turbine blade is higher than a maximum pitch threshold may be discarded from the calibration process. Additionally, measurement data obtained when the pitch of the first wind turbine blade is lower than a minimum pitch threshold may discarded from the calibration process. It is difficult to construct a perfect filter that keeps all the reliable data and discards all the unreliable data. In practice, there will always be some overlap. With the aforementioned filtering technique, some of the reliable data may be discarded but more importantly all the unreliable data is discarded. However, a sufficient amount of data still remains to perform a reliable and accurate calibration.

The calibration process may for instance be based on data fitting, such as curve fitting or plane fitting, e.g. via the method of least squares. A plane fitting may for instance be carried out in a three dimensional diagram comprising the three spatial components of the aforementioned forces and/or moments.

The load sensors may be any suitable sensors such as but not limited to resistive strain gauges, piezo-electric strain gauges or fibre Bragg gratings or other fibre sensors.

The rotor azimuth angle, the blade pitch angle and the rotational speed of the rotor are typically known from operational conditions of the wind turbine. However, in principle these parameters may be derived by use of for instance accelerometers or other suitable measurement devices.

In principle, it may also be feasible to calibrate the sensors, when the generator is cut-in, but this adds complexity to the calculations, since accurate measurements of the main shaft torque may be required. In such a situation, the method comprises steps a)-f) only. The calibration may thus for instance be based only on measurements obtained when the wind speed is below a predetermined wind speed threshold and/or the rotational speed of the rotor is below a predetermined rotor speed threshold and/or any of the aforementioned embodiments and filtering methods. However, it should be noted that if the rotor speed is relatively high, and/or the pitch angle is relatively low (which is normally the case when the generator is cut-in) the aerodynamic forces on the blade may introduce a major element of uncertainty to the theoretical calculations. In a special situation, it may be possible to base calibration on data while the generator is cut-in at low rotor speed and the pitch angle is relatively high. However, this is an atypical operational condition of a wind turbine.

According to a second aspect, the invention also provides a wind turbine comprising: a rotor including a hub and a number of wind turbine blades, which extend radially from the hub, the hub being connected to a drive train including a generator, which converts mechanical rotational motion of the rotor into electrical energy, wherein said number of blades comprises at least a first wind turbine blade provided with a number of first load sensors including at least a primary load sensor and a secondary load sensor positioned in a first cross-section of the first wind turbine blade. The wind turbine is further provided with a calibration system for calibrating the first load sensors, the calibration system comprising: extraction means for determining operational parameters of the wind turbine and at least a rotor azimuth angle, and a pitch angle of the first wind turbine blade, preferably also a rotor speed of the rotor, logging means continuously logging samples comprising load measurements obtained from the first load sensors, and the operational parameters of the wind turbine, calculation means for calculating theoretical loads based on said samples, comparison means for comparing the theoretical loads and loads measurements, and calibration means for calibrating the first load sensors based on values obtained from the comparison means. The wind turbine may be adapted to carry out any of the aforementioned method embodiments.

BRIEF DESCRIPTION OF THE DRAWINGS

The invention is explained in detail below with reference to an embodiment shown in the drawings, in which.

DETAILED DESCRIPTION OF THE INVENTION

1. Introduction

New wind turbine blades are increasingly often equipped with load sensors used for control purposes and/or monitoring. In order to obtain reliable measurements, the load sensors must be calibrated. This can be done in the factory, but is relatively costly. If for some reason the load sensors need to be re-calibrated after some operation on the turbine, it would be very expensive to dismount the blades and carry them to the factory for calibration. Therefore, there is a demand for a possibility of calibrating the sensors on-site and preferably while the blade is mounted on the turbine.

This document describes a concept for fully automatic calibration of the sensors on-site while the turbine is running and connected to the grid. The methods and ideas are described, and the equations needed for implementation in the software for the auto calibration device are presented.

Figure 1:
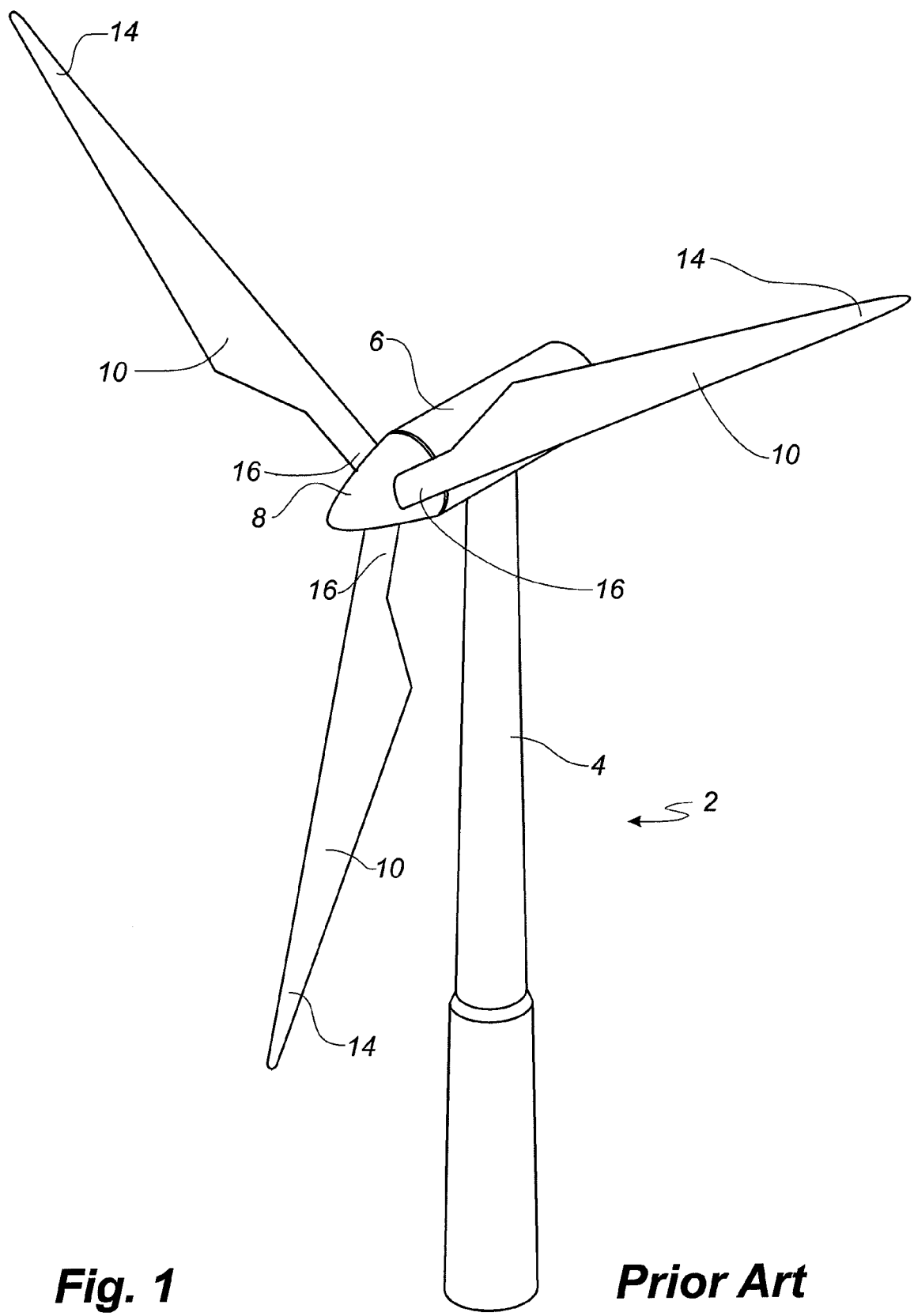
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
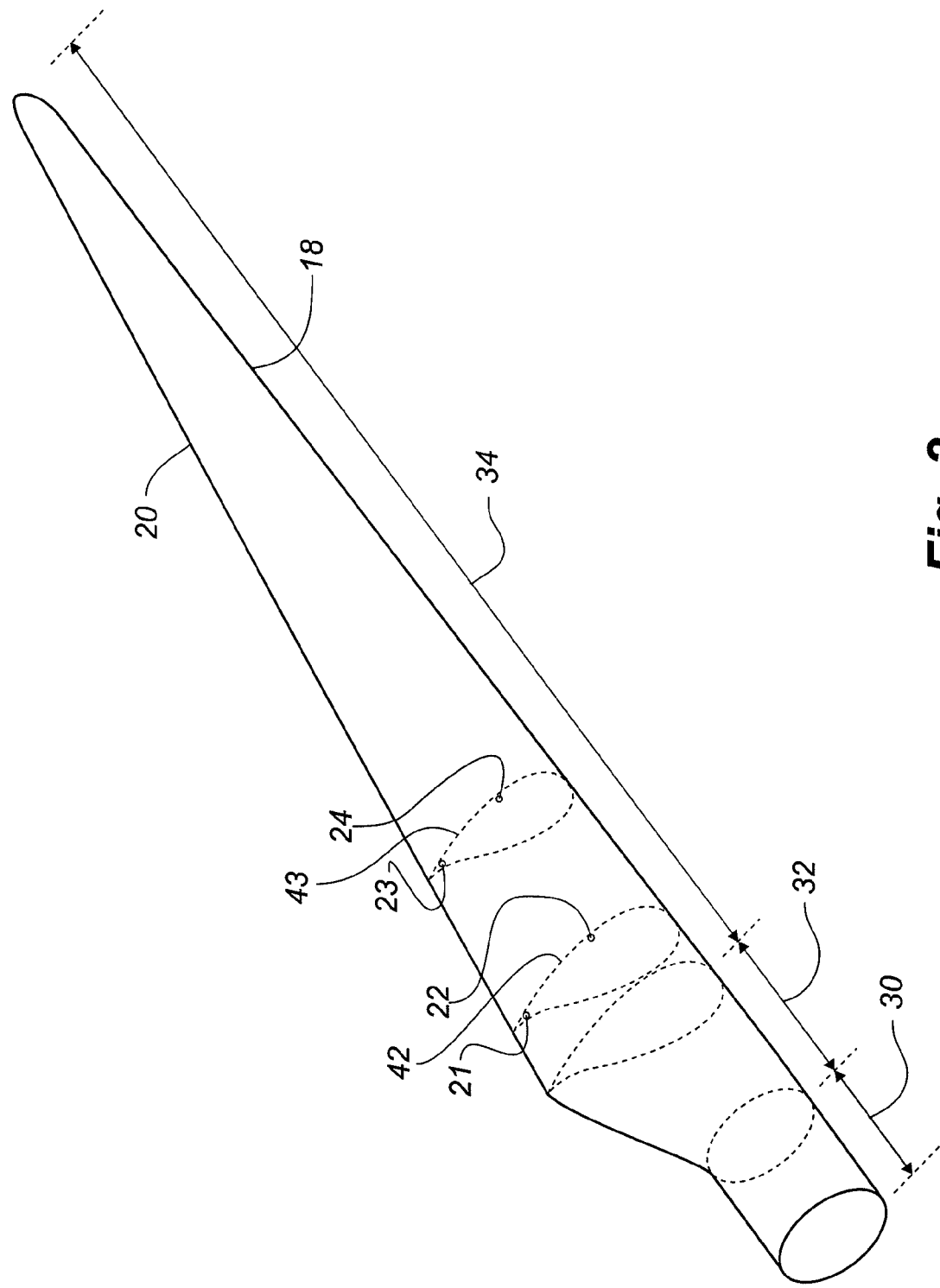
FIG. 2 shows a wind turbine blade according to the invention provided with load sensors.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10 when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root region 30. The transition region 32 has a transitional profile gradually changing from the circular or elliptical shape 40 of the root region 30 to the airfoil profile of the airfoil region 34. The width of the transition region 32 typically increases substantially linearly with increasing distance from the hub. The airfoil region 34 has an airfoil profile with a chord extending between the leading edge 18 and the trailing edge 20 of the blade 10. The width of the chord decreases with increasing distance from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 according to the invention is provided with a first load sensor (a first flap sensor) 21 and another load sensor (a first edge sensor) 22 located in a first cross-section 42 of the blade 10, as well as a second flap sensor 23 and a second edge sensor 24 located in a second cross-section 43 of the blade.

The calculations used for the calibration process are based on the parameters enclosed in section 15 and illustrated in FIGS. 3-7.

Figure 3:
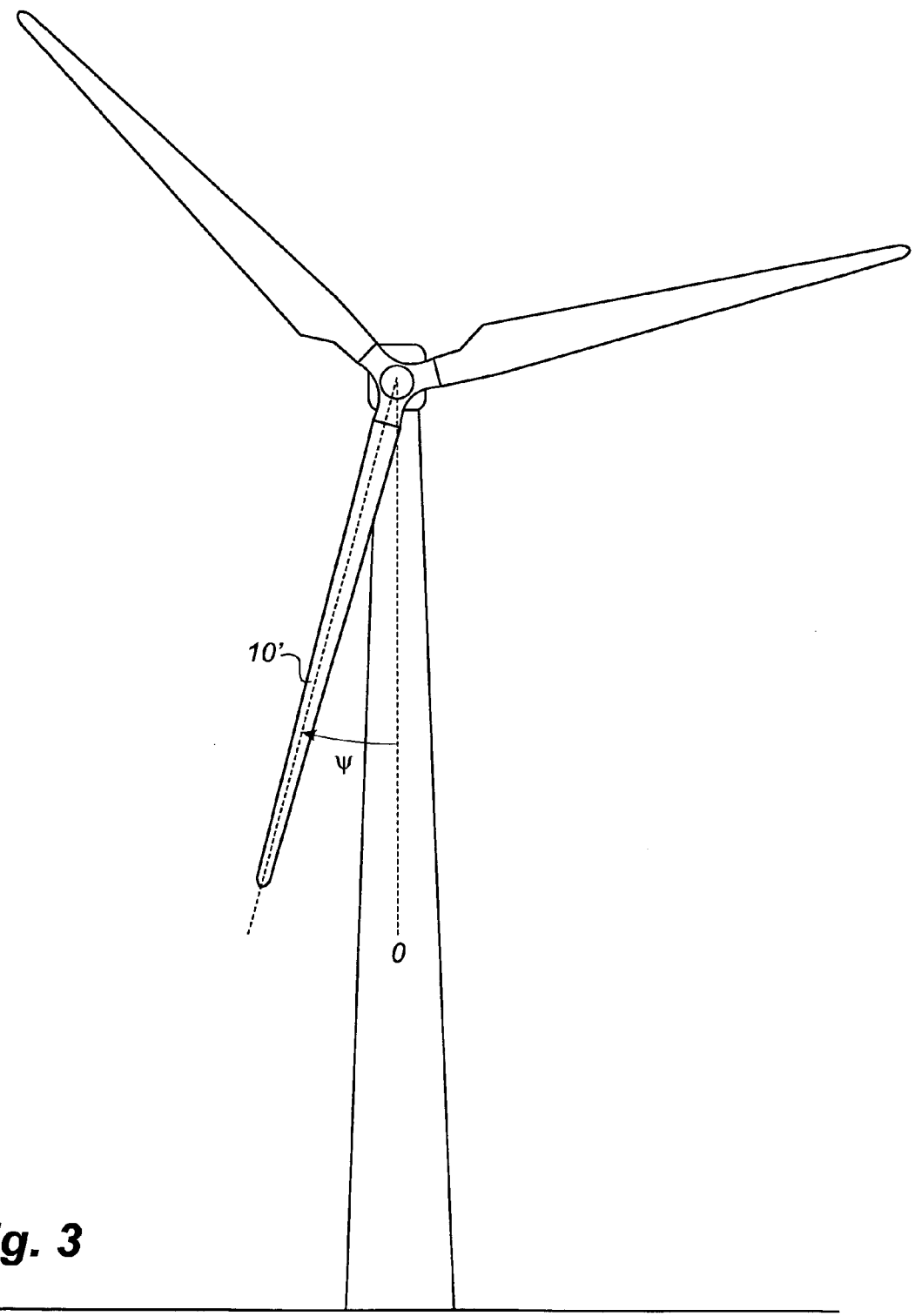
FIG. 3 illustrates a rotor azimuth angle used in the calibration method according to the invention.

FIG. 3 shows a wind turbine with a rotor comprising three wind turbine blades including a first wind turbine blade 10'. A rotor azimuth angle ψ of the first wind turbine blade 10' is defined as being 0 degrees, when the blade 10' is pointing downwards along a longitudinal axis 50 of the tower of the wind turbine. Thus, the rotor azimuth angle ψ is given as the angle between the longitudinal axis 50 of the tower and a longitudinal axis 52 of the first blade 10'. In order to calculate the rotor azimuth angles of the second and third wind turbine blade are displaced 120 degrees and −120 degrees of the rotor azimuth angle ψ of the first wind turbine blade 10', respectively.

Figure 4:
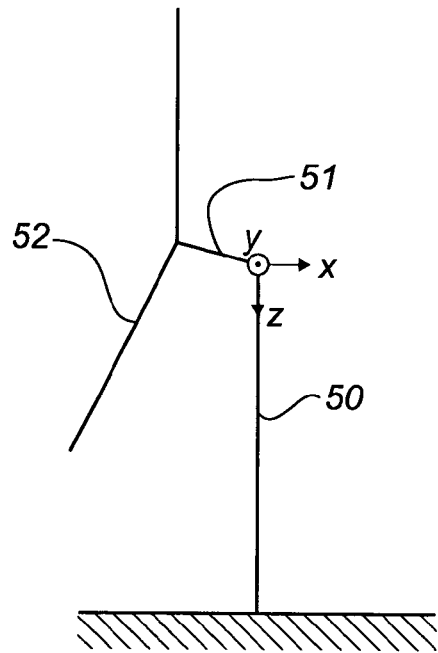
FIG. 4 illustrates a nacelle coordinate system used in the calibration method according to the invention.
Figure 5:
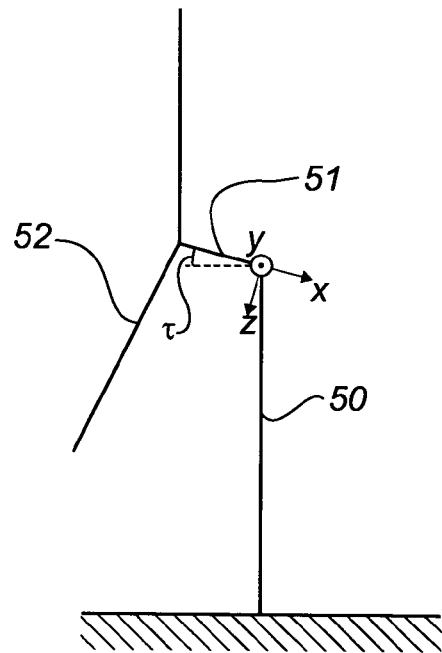
FIG. 5 illustrates a main bearing coordinate system used in the calibration method according to the invention.
Figure 6:
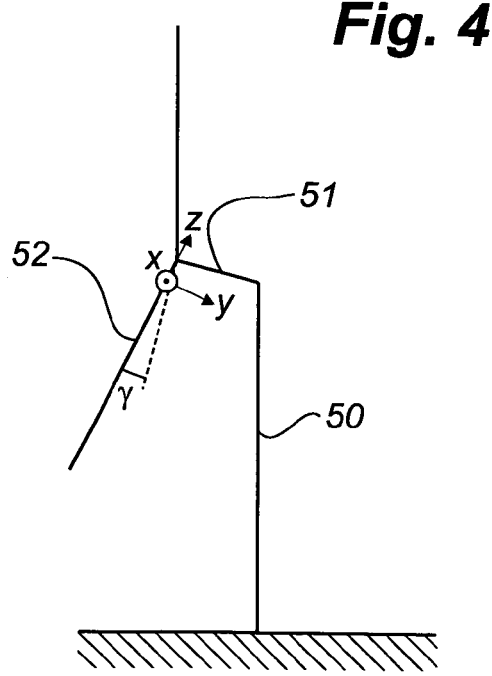
FIG. 6 illustrates a blade bearing coordinate system used in the calibration method according to the invention.

FIGS. 4-6 show simplistic models of a wind turbine illustrating further parameters used in the calibration method according to the invention. The models show the longitudinal axis 50 of the tower, a longitudinal axis 51 of the main bearing of the drive train of the wind turbine, and the longitudinal axis 52 of the first wind turbine blade 10'. FIG. 4 further show a nacelle coordinate system used in the calibration process, wherein the x-axis is directed in a downwind direction of the wind turbine, the z-axis is directed downwards along the longitudinal axis 50 of the tower, and the y-axis is perpendicular to the x-axis and the z-axis.

FIG. 5 shows a fixed main bearing coordinate system and a rotating rotor coordinate system, wherein the model is depicted with the rotor azimuth angle ψ equal to 0 degrees with the first blade 10' pointing downwards. The x-axis is directed in a downwind direction of the wind turbine along the longitudinal axis 51 of the main bearing, the y-axis is directed in the same direction as the y-axis of the nacelle coordinate system, and the z-axis is perpendicular to the x-axis and the y-axis. The rotor coordinate system rotates around the x-axis, and the coordinates of the nacelle coordinate system may be transformed to the fixed main bearing coordinate system and the rotor coordinate system via a tilt angle τ, which is defined as the angle between the longitudinal axis 51 of the main bearing and a horizontal plane.

FIG. 6 shows a blade bearing coordinate system and a blade coordinate system, wherein the model is depicted with a pitch angle θ of the first blade equal to 0 degrees. The z-axis is directed upwards along the longitudinal axis 52 of the first wind turbine blade, the x-axis is directed in the same direction as the y-axis of the nacelle coordinate system, and the y-axis is directed in a downwind direction perpendicular to the x-axis and the z-axis and thus also perpendicular to the longitudinal axis 52 of the first wind turbine blade. The blade bearing coordinate system rotates with the rotor coordinate system, and the blade coordinate system rotates around the z-axis relative to the blade bearing coordinate system based on the blade pitch θ. The coordinates of the fixed main bearing coordinate system and the rotating rotor coordinate system may be transformed to the blade bearing coordinate system and the blade coordinate system via the pitch angle θ of the first wind turbine blade, and a coning angle γ, which is defined as the angle between the longitudinal axis 52 of the first wind turbine blade and a plane perpendicular to the longitudinal axis 51 of the main bearing.

Figure 7:
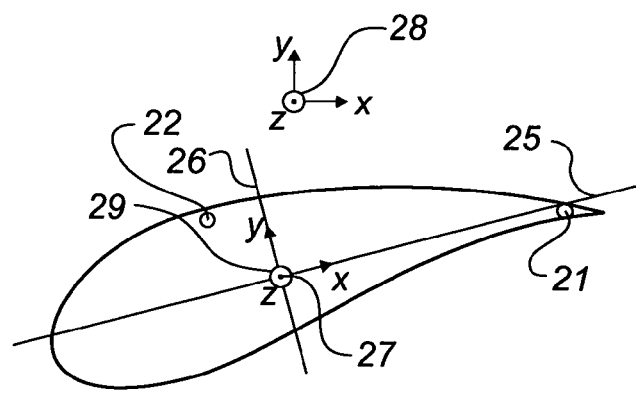
FIG. 7 illustrates a blade coordinate system and a profile coordinate system used in the calibration method according to the invention.

FIG. 7 shows the profile of the first cross section 42 of the first wind turbine blade and illustrates the relationship between the blade coordinate system 28 and a profile coordinate system 29. The blade profile comprises a first principal bending axis 25 and a second principal bending axis 26 crossing each other in an elastic centre 27 of the blade profile. The profile coordinate system 29 has its origin in the elastic centre 27, and the x-axis and y-axis are aligned with the first principal bending axis 25 and the second principal bending axis 26, respectively, whereas the z-axis is directed perpendicularly to the x-axis and y-axis. The blade coordinate system 28 may be transformed to the profile coordinate system 29 via an angle φ, which is defined as the angle between the blade coordinate system 28 and the principal bending axes 25, 26. It is seen that the first flap sensor 21 is located at the trailing edge near the first principal bending axis 25, whereas the first edge sensor 22 is located at a suction side of the blade profile near the second principal bending axis 26.

2. Description of Concept

The basis for the on-site auto calibration concept described in this document is the REpower 5M turbine with LM 61.5 P2 blades equipped with a fibre sensor system, such as a fibre Bragg grating sensor system, that consists of two sensors 21, 22 (one flap sensor and one edge sensor as shown in FIG. 2 and FIG. 7) placed at z=−8.12 m and two sensors 23, 24 at z=−23.12 m, a total of four sensors per blade. It is noted that the cross sections are located at negative value of z, since the z-axis is pointing away from the tip, cf. FIG. 6. The sensors 21-24 measure the strain in the blade at the position they are mounted. The flap sensors 21, 23 and edge sensors 22, 24 are not necessarily mounted exactly on the principal bending axes 25, 26, but using a combination of the two sensor measurements in one blade cross section it is possible, by the principle of superposition, to calculate the flapwise and edgewise bending moments.

The advantage of the present concept is that it is possible to calibrate the sensors 21-24 on-site while the blades are mounted on the turbine. There is no need to dismount the blades from the turbine. The calibration is carried out while the turbine is running and connected to the grid. A system is continuously logging the relevant data (turbine operating conditions and sensor measurements), and after some time it has collected enough data to be able to do a reliable calibration of the sensors.

The calibration is done fully automatic. There is no special calibration procedure, i.e. there is no requirement for human interaction or doing special maneuvers with the turbine. All data are collected during normal operation of the turbine. However, most of the useful data will be collected mainly in situations where the turbine is idling at low wind speeds and during startup of the turbine. These operational situations occur relatively often, so it is just a matter of time before the system has collected enough data to do the calibration.

When the system is continuously re-calibrating the sensors, it is possible to detect sudden changes in the calibration values that could indicate changes in the bending stiffness. This could reveal aging or a possible damage of the blade.

3. Methods

In the following a simple idea making it possible to make in situ calibrations possible is described.

To do the calibration, a measurement from the sensors 21-24 is needed while the blade is exposed to a known load. The load causes a strain in the blade at the sensor position. If the load is known, it is possible to calculate the theoretical strain level. If the sensor measurement does not show this value, the sensor should be calibrated correspondingly to show the correct value.

A known load can be applied to the blade by the case, where the rotor is non-rotating and positioned at the azimuth angle 90° (i.e. the blade is hanging in a horizontal position). When the blade own weight moment is known, it is possible to calculate the static strain level. By pitching the blade at 0° and 90° the own weight load can be applied in the edgewise and flapwise directions, respectively, enabling a calibration of both sensors 21-24. The procedure is repeated for all three blades.

The above idea requires the turbine to do special maneuvers during the calibration. In order to avoid this, a more sophisticated approach according to the invention is used.

Regardless of azimuth angle $\psi$ and pitch angle $\theta$, it is possible to calculate the own weight load on the blade using some coordinate transformations. If the turbine rotor is rotating and/or the blade is pitching, dynamic forces (centrifugal and Coriolis forces) act on the blades. If the rotation is accelerating also inertial forces act on the blade. All these forces can be calculated theoretically. This approach is used in the present auto calibration concept.

Furthermore, if there is some wind or rotation, aerodynamic forces will act on the blade. These forces will tend to accelerate the rotor, and based on the rate of rotor acceleration a simplified aerodynamic model is added to take this into account. Also a model for frictional losses in the drive train is added to get more accurate results.

The loads could be calculated by splitting the blade into several cross sections, and stepping through all blade sections summing up the loads. Doing these iterative calculations for each time sample requires a significant amount of computational capacity. Therefore, a better approach was invented. Instead of summing up the loads of the blade sections, the loads can be calculated using some general properties of the entire blade and the part of the blade that is outside or outboard the cross section of the sensors, such as mass, mass moment, moments and products of inertia etc. Once these properties are calculated, the rest of the calculations can be executed linearly and are much less time-consuming, because the iteration through all the blade sections are avoided. This innovative approach enables a real time calculation without requiring excessive computational capacity. This means that the measurements can be processed immediately after each sample, and the calibration can run continuously.

Due to some model uncertainties and restrictions, not all samples are useful for the calibration, so the collected data have to be filtered. Finally, when enough data are collected, the theoretically calculated loads can be plotted against the measured strain levels in 3-dimensional diagrams. The result should be plots with most data points located close to a plane. For the calibration, a function that describes the mapping of measured strain levels into the theoretically calculated loads. The best fit is found using e.g. the method of least squares.

4. General Equations for Turbine and Blade Data

To prepare the calculations to be done for each time sample, first some general once-and-for-all calculations must be done.

In the following the blades are considered as rigid bodies, and elastic deformations of the turbine are neglected.

Figure 8:
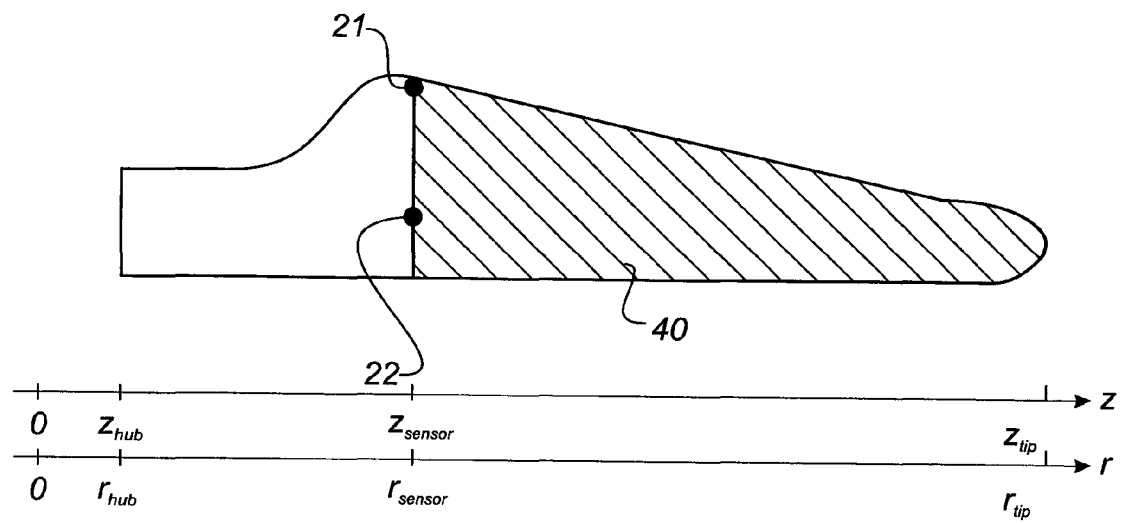
FIG. 8 illustrates further general properties of the wind turbine blade used in the calibration method according to the invention.

The radial distance from the rotor centre to the first cross section, where the first sensors 21, 22 are located is calculated by eq. 4.1, cf. also FIG. 8. If there is more than one cross section with sensors (e.g. two cross sections per blade), the distance for each cross section must be calculated separately.

$$r_{sensor} = r_{hub} - z_{sensor} \cdot \cos \gamma. \tag{4.1}$$

The radial distance from the rotor centre to the blade tip is $$r_{tip} = r_{hub} - z_{tip} \cdot \cos \gamma. \tag{4.2}$$

It should be noted that r and z typically are not equal and it is clear from the above equations that the two axes therefore may be differently scaled.

The mass of a part 40 of the blade that is located outside or outboard of the cross section where the sensors 21, 22 are located is calculated by eq. 4.3. If there is more than one cross section with sensors, calculation of the mass must be repeated for each cross section.

$$m = \int_{z_{tip}}^{z_{sensor}} m' dz. \tag{4.3}$$

The total blade mass is $$m_{blade} = \int_{z_{tip}}^{0} m' dz. \tag{4.4}$$

The static moments around the blade root ($1^{st}$ mass moment of inertia), taking into account only the part 40 of the blade that is outside the first cross section where the sensors are located, are calculated by eq. 4.5-4.7. If there is more than one cross section with sensors, calculation of the static moments must be repeated for each cross section.

$$S_x = \int_{z_{tip}}^{z_{sensor}} m' x_{c.g.} dz, \tag{4.5}$$

$$S_y = \int_{z_{tip}}^{z_{sensor}} m' y_{c.g.} dz, \tag{4.8}$$

$$S_z = \int_{z_{tip}}^{z_{sensor}} m' z \, dz. \tag{4.7}$$

The static moments for the entire blade is $$S_{x,blade} = \int_{z_{tip}}^{0} m' x_{c.g.} dz, \tag{4.8}$$

$$S_{y,blade} = \int_{z_{tip}}^{0} m' y_{c.g.} dz, \tag{4.9}$$

$$S_{z,blade} = \int_{z_{tip}}^{0} m' z \, dz. \tag{4.10}$$

The distribution of mass moments of inertia and products of inertia around the blade root are calculated by eq. 4.11-4.16. The last formulation after the 'almost equal to' sign is an approximation that can be used if the exact value cannot be calculated. In some situations only the exact moments of inertia but not the products of inertia are calculated. In this case, the approximation for the products of inertia can be used.

$$I'_{xx}(z) = \iint_A \rho \cdot (y^2 + z^2) dA \approx m' \cdot (y_{c.g.}^2 + z^2 + 0.005 \cdot c^2 + 0.112 \cdot t^2), \tag{4.11}$$

$$I'_{yy}(z) = \iint_A \rho \cdot (x^2 + z^2) dA \approx m' \cdot (x_{c.g.}^2 + z^2 + 0.058 \cdot c^2 + 0.061 \cdot t^2), \tag{4.12}$$

$$I'_{zz}(z) = \iint_A \rho \cdot (x^2+y^2) dA \approx m' \cdot (x_{c.g.}^2 + y_{c.g.}^2 + 0.054 \cdot c^2 + 0.168 \cdot t^2), \quad (4.13)$$

$$I'_{xy}(z) = \iint_A \rho \cdot x \cdot y \, dA \approx m' \cdot x_{c.g.} \cdot y_{c.g.}, \quad (4.14)$$

$$I'_{xz}(z) = \iint_A \rho \cdot x \cdot z \, dA \approx m' \cdot x_{c.g.} \cdot z, \quad (4.15)$$

$$I'_{yz}(z) = \iint_A \rho \cdot x \cdot z \, dA \approx m' \cdot y_{c.g.} \cdot z. \quad (4.16)$$

The mass moments of inertia and products of inertia around the blade root, taking into account only the part 40 of the blade that is outside the cross section, where the sensors 21, 22 are located, are calculated by eq. 4.17-4.22. If there is more than one cross section with sensors, calculation of the moments and products of inertia must be repeated for each cross section.

$$I_{xx} \int_{z_{tip}}^{z_{sensor}} I'_{xx}(z) dz, \quad (4.17)$$

$$I_{yy} \int_{z_{tip}}^{z_{sensor}} I'_{yy}(z) dz, \quad (4.18)$$

$$I_{zz} \int_{z_{tip}}^{z_{sensor}} I'_{zz}(z) dz, \quad (4.19)$$

$$I_{xy} \int_{z_{tip}}^{z_{sensor}} I'_{xy}(z) dz, \quad (4.20)$$

$$I_{xz} \int_{z_{tip}}^{z_{sensor}} I'_{xz}(z) dz, \quad (4.21)$$

$$I_{yz} \int_{z_{tip}}^{z_{sensor}} I'_{yz}(z) dz. \quad (4.22)$$

The mass moments of inertia and products of inertia from eq. 4.17-4.22 must be transferred to be taken around a fixed point in the rotor centre, using eq. 4.23-4.28. If there is more than one cross section with sensors, the transfer of the moments and products of inertia must be repeated for each cross section.

$$I_{Oxx} = I_{xx} + \frac{r_{hub}}{\cos\gamma} \cdot \left(-2 \cdot S_z + m \cdot \frac{r_{hub}}{\cos\gamma}\right), \quad (4.23)$$

$$I_{Oyy} = I_{yy} + \frac{r_{hub}}{\cos\gamma} \cdot \left(-2 \cdot S_z + m \cdot \frac{r_{hub}}{\cos\gamma}\right), \quad (4.24)$$

$$I_{Ozz} = I_{zz}, \quad (4.25)$$

$$I_{Oxy} = I_{xy}, \quad (4.26)$$

$$I_{Oxz} = I_{xz} - S_x \cdot \frac{r_{hub}}{\cos\gamma}, \quad (4.27)$$

$$I_{Oyz} = I_{yz} - S_y \cdot \frac{r_{hub}}{\cos\gamma}. \quad (4.28)$$

The mass moments of inertia and products of inertia of the entire blade are $$I_{xx,blade} \int_{z_{tip}}^{0} I'_{xx}(z) dz, \quad (4.29)$$

$$I_{yy,blade} \int_{z_{tip}}^{0} I'_{yy}(z) dz, \quad (4.30)$$

$$I_{zz,blade} \int_{z_{tip}}^{0} I'_{zz}(z) dz, \quad (4.31)$$

$$I_{xy,blade} \int_{z_{tip}}^{0} I'_{xy}(z) dz, \quad (4.32)$$

$$I_{xz,blade} \int_{z_{tip}}^{0} I'_{xz}(z) dz, \quad (4.33)$$

$$I_{yz,blade} \int_{z_{tip}}^{0} I'_{yz}(z) dz. \quad (4.34)$$

The mass moments of inertia and products of inertia from eq. 4.29-4.34 must be transferred to be taken around a fixed point in the rotor centre, using eq. 4.35-4.40.

$$I_{Oxx,blade} = I_{xx,blade} + \frac{r_{hub}}{\cos\gamma} \cdot \left(-2 \cdot S_{z,blade} + m_{blade} \cdot \frac{r_{hub}}{\cos\gamma}\right), \quad (4.35)$$

$$I_{Oyy,blade} = I_{yy,blade} + \frac{r_{hub}}{\cos\gamma} \cdot \left(-2 \cdot S_{z,blade} + m_{blade} \cdot \frac{r_{hub}}{\cos\gamma}\right), \quad (4.36)$$

$$I_{Ozz,blade} = I_{zz,blade}, \quad (4.37)$$

$$I_{Oxy,blade} = I_{xy,blade}, \quad (4.38)$$

$$I_{Oxz,blade} = I_{xz,blade} - S_{x,blade} \cdot \frac{r_{hub}}{\cos\gamma}, \quad (4.39)$$

$$I_{Oyz,blade} = I_{yz,blade} - S_{y,blade} \cdot \frac{r_{hub}}{\cos\gamma}. \quad (4.40)$$

Finally, some factors for the aerodynamic force and moment must be estimated. If there is more than one cross section with sensors, the factors must be estimated for each cross section. The factors can be found using eq. 4.41 and 4.42.

$$f_F = k_F \cdot \frac{p+2}{p+1} \cdot \left(1 - \left(\frac{r_{sensor}}{r_{tip}}\right)^{p+1}\right), \quad (4.41)$$

$$f_M = k_M \cdot \left(1 - \left(\frac{r_{sensor}}{r_{tip}}\right)^{p+2}\right). \quad (4.42)$$

The exponent p is a real number greater than −1 and depends on the distribution of the aerodynamic force; p=0 fits a constant distribution of the aerodynamic force as a function of radius ($\sim r^0$), p=1 fits a linear distribution of the aerodynamic force that is proportional to the radius ($\sim r^1$), p=2 fits a quadratic distribution of the aerodynamic force ($\sim r^2$) etc. It has been found that p=0 is a reasonably good assumption for this purpose, and therefore it is recommended to use p=0.

The correction factors $k_F$ and $k_M$ are equal to 1, in the case where the aerodynamic distribution perfectly fits a power function. Taking into account an arbitrary deviation from the power function, the correction factors might deviate from 1. At first, the correction factors can be approximated to be equal to 1. For an improved aerodynamic model, the correction factors $k_F$ and $k_M$ should be fine-tuned empirically to give the best possible fit between the real and the estimated aerodynamic loads.

5.1 Equations to Use for Each Time Sample

For each time sample, where the measurements are not discarded due to the data filtration, the following calculations must be done.

In general, if there is more than one blade with sensors (typically three blades) and if there is more than one cross section with sensors (e.g. two cross sections per blade), all parameters that refer to the blade cross section must be calculated separately for each of the cross sections equipped with sensors.

Again, the definitions of the coordinate systems are shown in FIGS. 3-7.

5.1 Gravitational Forces and Moments

The gravity components in the nacelle coordinate system is $$g_{x,n.s.} = 0, \quad (5.1)$$

$$g_{y,n.s.} = 0, \quad (5.2)$$

$$g_{z,n.s.} = g. \quad (5.3)$$

The gravity components are transformed into the main bearing coordinate system taking into account the tilt angle τ. Please note that the tilt angle is defined opposite the coordinate system.

$$g_{x,m.b.s.} = g_{x,n.s.} \cdot \cos \tau + g_{z,n.s.} \cdot \sin \tau, \quad (5.4)$$

$$g_{y,m.b.s.} = g_{y,n.s.}, \quad (5.5)$$

$$g_{z,m.b.s.} = -g_{x,n.s.} \cdot \sin \tau + g_{z,n.s.} \cdot \cos \tau. \quad (5.6)$$

Subsequently, the gravity components are transformed into the rotor coordinate system taking into account the azimuth angle ψ. Eq. 5.7-5.9 are valid for the first blade 10' (pointing downwards at ψ=0°. For any other blades, the azimuth angle ψ must be displaced by the angular distance between the blades (e.g. 120° for a three-bladed rotor).

$$g_{x,r.s.} = g_{x,m.b.s.}, \quad (5.7)$$

$$g_{y,r.s.} = g_{y,m.b.s.} \cdot \cos \psi + g_{z,m.b.s.} \cdot \sin \psi, \quad (5.8)$$

$$g_{z,r.s.} = -g_{y,m.b.s.} \cdot \sin \psi + g_{z,m.b.s.} \cdot \cos \psi, \quad (5.9)$$

Most of the following equations in this chapter must be repeated separately for each blade.

Now, the gravity components are transformed into the blade bearing coordinate system taking into account the cone angle γ. Please note that, in addition to the rotation due to the cone angle, the blade bearing coordinate system is rotated compared to the rotor coordinate system.

$$g_{x,b.b.s.} = g_{y,r.s.}, \quad (5.10)$$

$$g_{y,b.b.s.} = g_{x,r.s.} \cdot \cos \gamma - g_{z,r.s.} \cdot \sin \gamma, \quad (5.11)$$

$$g_{z,b.b.s.} = -g_{x,r.s.} \cdot \sin \gamma - g_{z,r.s.} \cdot \cos \gamma, \quad (5.12)$$

Finally, the gravity components are transformed into the blade coordinate system taking into account the pitch angle θ.

$$g_{x,b.s.} = g_{x,b.b.s.} \cdot \cos \theta + g_{y,b.b.s.} \cdot \sin \theta, \quad (5.13)$$

$$g_{y,b.s.} = -g_{x,b.b.s.} \cdot \sin \theta + g_{y,b.b.s.} \cdot \cos \theta, \quad (5.14)$$

$$g_{z,b.s.} = g_{z,b.b.s.}. \quad (5.15)$$

Now, the axial force and the bending moments due to gravity, for the blade cross section where the sensors are located, can be calculated.

$$F_{z,b.s.,grav.} = m \cdot g_{z,b.s.}, \quad (5.16)$$

$$M_{x,b.s.,grav.} = -(S_z - m \cdot z_{sensor}) \cdot g_{y,b.s.} + S_y \cdot g_{z,b.s.}, \quad (5.17)$$

$$M_{y,b.s.,grav.} = (S_z - m \cdot z_{sensor}) \cdot g_{x,b.s.} - S_x \cdot g_{z,b.s.}. \quad (5.18)$$

5.2 Inertia Forces

In all the following calculations, inertia forces due to yawing of the turbine are neglected.

Due to rotation of the rotor, the blade coordinate system is rotating in space around the rotor axis. Therefore, centrifugal forces must be taken into account. The cross sectional force components due to the centrifugal force are $$F_{x,b.s.,rotor\ centrif.} = ((S_x \cdot \cos \theta - S_y \cdot \sin \theta) \cdot \cos \theta - (m \cdot r_{hub} - S_z \cdot \cos \gamma - (S_x \cdot \sin \theta + S_y \cdot \cos \theta) \cdot \sin \gamma) \cdot \sin \theta \cdot \sin \gamma) \cdot \omega^2, \quad (5.19)$$

$$F_{y,b.s.,rotor\ centrif.} = (-(S_x \cdot \cos \theta - S_y \cdot \sin \theta) \cdot \sin \theta - (m \cdot r_{hub} - S_z \cdot \cos \gamma - (S_x \cdot \sin \theta + S_y \cdot \cos \theta) \cdot \sin \gamma) \cdot \cos \theta \cdot \sin \gamma) \cdot \omega^2, \quad (5.20)$$

$$F_{z,b.s.,rotor\ centrif.} = -(m \cdot r_{hub} - S_z \cdot \cos \gamma - (S_x \cdot \sin \theta + S_y \cdot \cos \theta) \cdot \sin \gamma) \cdot \cos \gamma \cdot \omega^2. \quad (5.21)$$

Due to the rotor acceleration, the blade coordinate system is accelerating in space. Therefore, inertia forces due to rotor acceleration must be taken into account. The cross sectional force components due to the rotor acceleration are $$F_{x,b.s.,rotor\ acc.} = ((m \cdot r_{hub} - S_z \cdot \cos \gamma) \cdot \cos \theta - S_y \cdot \sin \gamma) \cdot \dot{\omega}, \quad (5.22)$$

$$F_{y,b.s.,rotor\ acc.} = (-(m \cdot r_{hub} - S_z \cdot \cos \gamma) \cdot \sin \theta - S_x \cdot \sin \gamma) \cdot \dot{\omega}, \quad (5.23)$$

$$F_{z,b.s.,rotor\ acc.} = (S_x \cdot \cos \theta - S_y \cdot \sin \theta) \cdot \cos \gamma \cdot \dot{\omega}, \quad (5.24)$$

Due to pitching of the blade, the blade coordinate system is rotating around the pitch axis. The cross sectional force components due to the centrifugal force originating from the blade pitching are $$F_{x,b.s.,pitch\ centrif.} = S_x \cdot \dot{\theta}^2, \quad (5.25)$$

$$F_{y,b.s.,pitch\ centrif.} = S_y \cdot \dot{\theta}^2, \quad (5.26)$$

$$F_{z,b.s.,pitch\ centrif.} = 0. \quad (5.27)$$

Due to the pitch acceleration, the blade coordinate system is accelerating around the pitch axis. The cross sectional force components due to the pitch acceleration are $$F_{x,b.s.,pitch\ acc.} = S_y \cdot \ddot{\theta}, \quad (5.28)$$

$$F_{y,b.s.,pitch\ acc.} = -S_x \cdot \ddot{\theta}, \quad (5.29)$$

$$F_{z,b.s.,pitch\ acc.} = 0. \quad (5.30)$$

In case of simultaneous rotation around the rotor axis and pitch axis, the blade is moving relative to a rotating coordinate system. Therefore, Coriolis forces must be taken into account. The cross sectional force components due to the Coriolis acceleration are $$F_{x,b.s.,Coriolis} = -S_x \cdot \sin \gamma \cdot 2 \cdot \omega \cdot \dot{\theta}, \quad (5.31)$$

$$F_{y,b.s.,Coriolis} = -S_y \cdot \sin \gamma \cdot 2 \cdot \omega \cdot \dot{\theta}, \quad (5.32)$$

$$F_{z,b.s.,Coriolis} = -(S_x \cdot \sin \theta + S_y \cdot \cos \theta) \cdot \cos \gamma \cdot 2 \cdot \omega \cdot \dot{\theta}. \quad (5.33)$$

Now, all the inertia forces can be added to obtain the total inertia force components for the cross section.

$$F_{x,b.s.,inertia} = F_{x,b.s.,rotor\ centrif.} + F_{x,b.s.,rotor\ acc.} + F_{x,b.s.,pitch\ centrif.} + F_{x,b.s.,pitch\ acc.} + F_{x,b.s.,Coriolis}, \quad (5.34)$$

$$F_{y,b.s.,inertia} = F_{y,b.s.,rotor\ centrif.} + F_{y,b.s.,rotor\ acc.} + F_{y,b.s.,pitch\ centrif.} + F_{y,b.s.,pitch\ acc.} + F_{y,b.s.,Coriolis}, \quad (5.35)$$

$$F_{z,b.s.,inertia} = F_{z,b.s.,rotor\ centrif.} + F_{z,b.s.,rotor\ acc.} + F_{z,b.s.,pitch\ centrif.} + F_{z,b.s.,pitch\ acc.} + F_{z,b.s.,Coriolis}. \quad (5.36)$$

5.3 Inertia Moments

First, the angular velocity components of the blade are calculated.

$$\omega_x = \omega \cdot \sin \theta \cdot \cos \gamma, \quad (5.37)$$

$$\omega_y = \omega \cdot \cos \theta \cdot \cos \gamma, \quad (5.38)$$

$$\omega_z = -\omega \cdot \sin \gamma + \dot{\theta}. \quad (5.39)$$

The angular acceleration components of the blade are $$\dot{\omega}_x = (\omega \cdot \cos \theta \cdot \dot{\theta} + \dot{\omega} \cdot \sin \theta) \cdot \cos \gamma, \quad (5.40)$$

$$\dot{\omega}_y = (-\omega \cdot \sin \theta \cdot \dot{\theta} + \dot{\omega} \cdot \cos \theta) \cdot \cos \gamma, \quad (5.41)$$

$$\dot{\omega}_x = -\dot{\omega} \cdot \sin \gamma + \ddot{\theta}. \quad (5.42)$$

The angular momentum components around a fixed point in the rotor centre, taking into account only the part 40 of the blade that is outside the cross section where the sensors are located, are calculated by eq. 5.43-5.45. These equations are the general expressions for the angular momentum about a fixed point for a rigid body.

$$H_{0x} = I_{0xx} \cdot \omega_x - I_{0xy} \cdot \omega_y - I_{0xz} \cdot \omega_z, \quad (5.43)$$

$$H_{0y} = -I_{0xy} \cdot \omega_x + I_{0yy} \cdot \omega_y - I_{0yz} \cdot \omega_z, \quad (5.44)$$

$$H_{0z} = -I_{0xz} \cdot \omega_x - I_{0yz} \cdot \omega_y - I_{0zz} \cdot \omega_z. \quad (5.45)$$

The time derivatives of the angular momentum x- and y-components from eq. 5.43 and 5.44 are $$\dot{H}_{0x} = I_{0xx} \cdot \dot{\omega}_x - I_{0xy} \cdot \dot{\omega}_y - I_{0xz} \cdot \dot{\omega}_z, \quad (5.46)$$

$$\dot{H}_{0y} = -I_{0xy} \cdot \dot{\omega}_x + I_{0yy} \cdot \dot{\omega}_y - I_{0yz} \cdot \dot{\omega}_z. \quad (5.47)$$

Now the moment x- and y-components due to inertia forces can be calculated. Eq 5.48 and 5.49 are the general momentum equations for rigid body motion with axes attached to the body. They refer to the moment originating from the inertia forces taking into account only the part of the blade that is outside the cross section where the sensors are located. The inertia moments are taken around a fixed point in the rotor centre.

$$M_{0x,b.s.,inertia} = -\dot{H}_{0x} + H_{0y} \cdot \omega_z - H_{0z} \cdot \omega_y, \quad (5.48)$$

$$M_{0y,b.s.,inertia} = -\dot{H}_{0y} + H_{0z} \cdot \omega_x - H_{0x} \cdot \omega_z. \quad (5.49)$$

Finally, the inertia moments are moved to the cross section where the sensors are located.

$$M_{x,b.s.,inertia} = M_{0x,b.s.,inertia} - F_{y,b.s.,inertia} \cdot \left(\frac{r_{hub}}{\cos\gamma} - z\right), \quad (5.50)$$

$$M_{y,b.s.,inertia} = M_{0y,b.s.,inertia} - F_{x,b.s.,inertia} \cdot \left(\frac{r_{hub}}{\cos\gamma} - z\right). \quad (5.51)$$

5.4 Aerodynamic Forces and Moments

First, the blade mass moment of inertia around the rotor axis is calculated. In case of individual pitch, equation 5.52 must be repeated for each blade separately.

$$I_{0xx,r.s.,blade,i} = I_{0xx,blade} \cdot \sin^2\theta_i \cdot \cos^2\gamma + I_{0yy,blade} \cdot \cos^2\theta_i \cdot \cos^2\gamma + \quad (5.52)$$
$$I_{0zz,blade} \cdot \sin^2\gamma - 2 \cdot I_{0xy,blade} \cdot \sin\theta_i \cdot \cos\theta_i \cdot \cos^2\gamma +$$
$$2 \cdot I_{0xz,blade} \cdot \sin\theta_i \cdot \sin\gamma \cdot \cos\gamma + 2 \cdot I_{0yz,blade} \cdot \cos\theta_i \cdot \sin\gamma \cdot \cos\gamma.$$

The mass moment of inertia of the complete rotor including the drive train is $$I_{0xx,rotor} = \sum_{i=1}^{B} I_{0xx,r.s.,blade,i} + I_{0xx,hub} + n_{gear}^2 \cdot I_{0xx,generator}. \quad (5.53)$$

The following equations in this section apply for all blades, because the aerodynamic load is assumed to be evenly distributed and therefore the same for all blades.

The mechanical friction losses in the drive train are modeled by a general 3$^{rd}$ order polynomial function of the rotor speed.

$$M_{x,friction} = \quad (5.54)$$
$$-\left(a_1 \cdot \frac{1}{\omega_{nom.}} \cdot \text{sign}(\omega) + a_2 \cdot \frac{\omega}{\omega_{nom.}^2} + a_3 \cdot \frac{\omega^2}{\omega_{nom.}^3} \cdot \text{sign}(\omega)\right).$$

If the rotor is balanced, the rotor acceleration is exclusively caused by aerodynamic moments acting on the rotor, frictional losses in the drive train, the generator and possibly the mechanical brake. In the following it is assumed, that the generator is not connected, i.e. cut out, and the brake is not activated. Therefore, neglecting generator and brake moments, the aerodynamic rotor moment can be calculated as $$M_{x,rotor,aero.} = I_{0xx,rotor} \cdot \dot{\omega} - M_{x,friction}. \quad (5.55)$$

The distribution of aerodynamic forces on the rotor is unknown, but some assumption has to be made. Here it is assumed, that the aerodynamic loading in terms of local thrust coefficient is evenly distributed on the rotor.

Now, the aerodynamic forces and moments in the blade bearing coordinate system can be calculated. Eq. 5.56 and 5.57 refer to the aerodynamic forces acting only on the part 40 of the blade that is outside the cross section where the sensors 21, 22 are located. The moment is taken around the cross section where the sensors are located.

$$F_{x,b.b.s.,aero.} = -f_F \cdot \frac{M_{x,rotor,aero.}}{B \cdot r_{tip}}, \quad (5.56)$$

$$F_{z,b.b.s.,aero.} = 0, \quad (5.57)$$

$$M_{y,b.b.s.,aero.} = \frac{f_M \cdot \frac{M_{x,rotor,aero.}}{B} + F_{x,b.b.s.,aero.} \cdot r_{sensor}}{\cos\gamma}. \quad (5.58)$$

The aerodynamic force out of the rotor plane is difficult to estimate, because the rotor acceleration is not a direct indication of the force out of the rotor plane. But there is coherence between the in plane and out of plane loads. The aerodynamic loads on the blade will typically act mainly in the direction perpendicular to the chord line. This information is useful to estimate the out of plane loads. If the direction of the resulting aerodynamic force is known, the out of plane loading can be calculated by eq. 5.59. Here it is assumed, that the direction of the aerodynamic load is dependent on the pitch angle θ and is generally offset by a constant angle $\theta_{aero.}$. The angle $\theta_{aero.}$ is determined empirically as the angle that gives the best fit between the actual out of plane aerodynamic loads and the ones estimated by eq. 5.59.

$$M_{x,b.b.s.,aero.} = -M_{y,b.b.s.,aero.} \cdot \tan(\theta + \theta_{aero.}). \quad (5.59)$$

Finally, the aerodynamic load components are transformed into the blade coordinate system.

$$F_{z,b.s.,aero.} = 0, \quad (5.60)$$

$$M_{x,b.s.,aero.} = M_{x,b.b.s.,aero.} \cdot \cos\theta + M_{y,b.b.s.,aero.} \cdot \sin\theta, \quad (5.61)$$

$$M_{y,b.s.,aero.} = -M_{x,b.b.s.,aero.} \cdot \sin\theta + M_{y,b.b.s.,aero.} \cdot \cos\theta. \quad (5.62)$$

5.5 Total Forces and Moments

Now, the gravitational loads, inertia loads and aerodynamic loads can be added to obtain the total loads.

$$F_{z,b.s.} = F_{z,b.s.,grav.} + F_{z,b.s.,inertia} + F_{z,b.s.,aero.}, \quad (5.63)$$

$$M_{x,b.s.} = M_{x,b.s.,grav.} + M_{x,b.s.,inertia} + M_{x,b.s.,aero.}, \quad (5.64)$$

$$M_{y,b.s.} = M_{y,b.s.,grav.} + M_{y,b.s.,inertia} + M_{y,b.s.,aero.}. \quad (5.65)$$

Because the blade is bending around the principal bending axes 25, 26, the loads must be transformed into the local profile coordinate system, which is composed of the principal bending axes of the cross section.

$$F_{z,b.s.} = F_{z,b.s.}, \quad (5.66)$$

$$M_{x,p.s.} = (M_{x,b.s.} - F_{z,b.s.} \cdot y_{e.c.}) \cdot \cos \phi + (M_{y,b.s.} + F_{z,b.s.} \cdot x_{e.c.}) \cdot \sin \phi, \quad (5.67)$$

$$M_{y,p.s.} = -(M_{x,b.s.} - F_{z,b.s.} \cdot y_{e.c.}) \cdot \sin \phi + (M_{y,b.s.} + F_{z,b.s.} \cdot x_{e.c.}) \cdot \cos \phi. \quad (5.68)$$

6. Verification

The calculations described in sections 4 and 5 are validated by comparing the results with simulations by the aeroelastic code Flex5.

In the calculations the following parameters for the aerodynamic model are used.

TABLE 6.1

Parameters for the aerodynamic model. Note that $\theta_{aero.}$ must be in radians in the calculations.

|  | z = −8.12 m | z = −23.12 m |
|---|---|---|
| p | 0 | 0 |
| $k_F$ | 1.47 | 1.28 |
| $k_M$ | 1 | 1 |
| $\theta_{aero.}$ | 98.9° | 97.4° |

It was found that the calculations for the sensors positioned in z=−23.12 m have larger (roughly twice as large) uncertainties than for z=−8.12 m. This is caused by the weight of the outer part of the blade being relatively smaller, and the aerodynamic disturbance is relatively larger for cross sections closer to the tip. In the following, only results for z=−23.12 m are shown.

Figure 9:
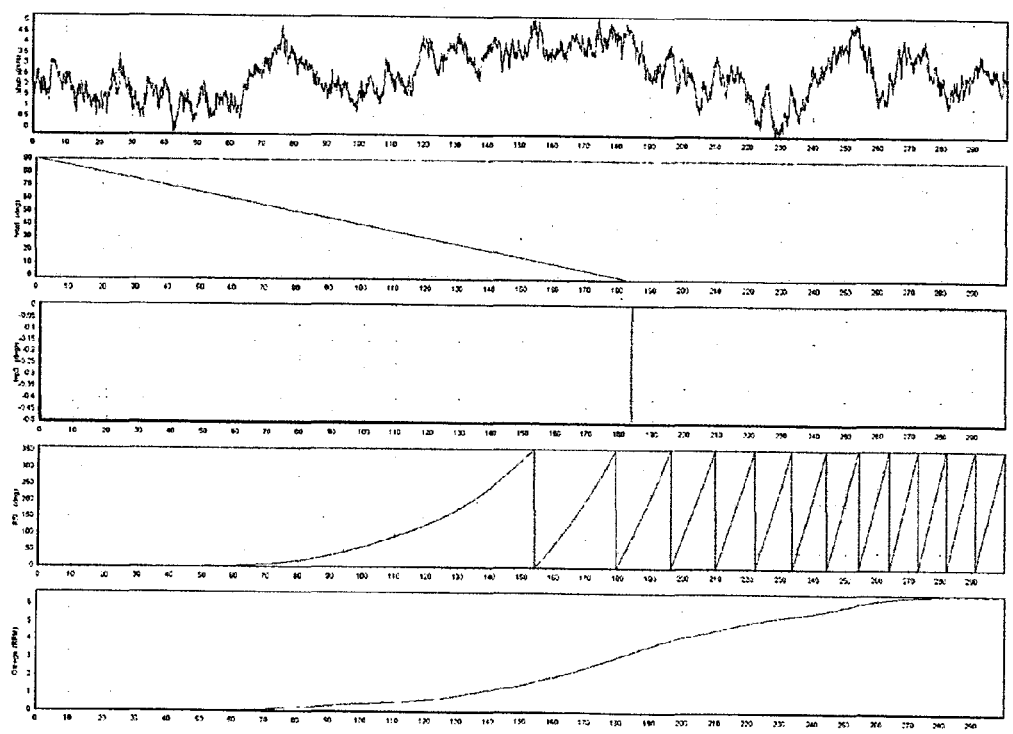
FIG. 9 shows data from a wind turbine start-up simulation.

A long-drawn-out turbine startup was simulated by Flex5 using turbulent wind and a mean wind speed of 2.5 m/s. The rotor starts at standstill and accelerates slowly up to around 6.5 rpm (just below generator cut-in speed) while the pitch moves from 90° down to −1.8° at a pitch rate of −0.5°/s. The simulation is illustrated with the graphs in FIG. 9 showing respective a) the undisturbed longitudinal component of the wind speed at the rotor hub, b) the pitch angle of the first wind turbine blade, c) the pitch rate of the first wind turbine blade, d) the rotor azimuth angle of the first wind turbine blade, and e) the rotor speed as a function of time.

The simulated azimuth angle $\psi$, rotor speed $\omega$, pitch angle $\theta$ and pitch rate $\dot\theta$ as a function of time were used as input for the current model to verify, that the model is capable of calculating the cross sectional loads in the profile coordinate system by means of these parameters only.

6.1 Gravitational and Inertia Loads

Figure 10:
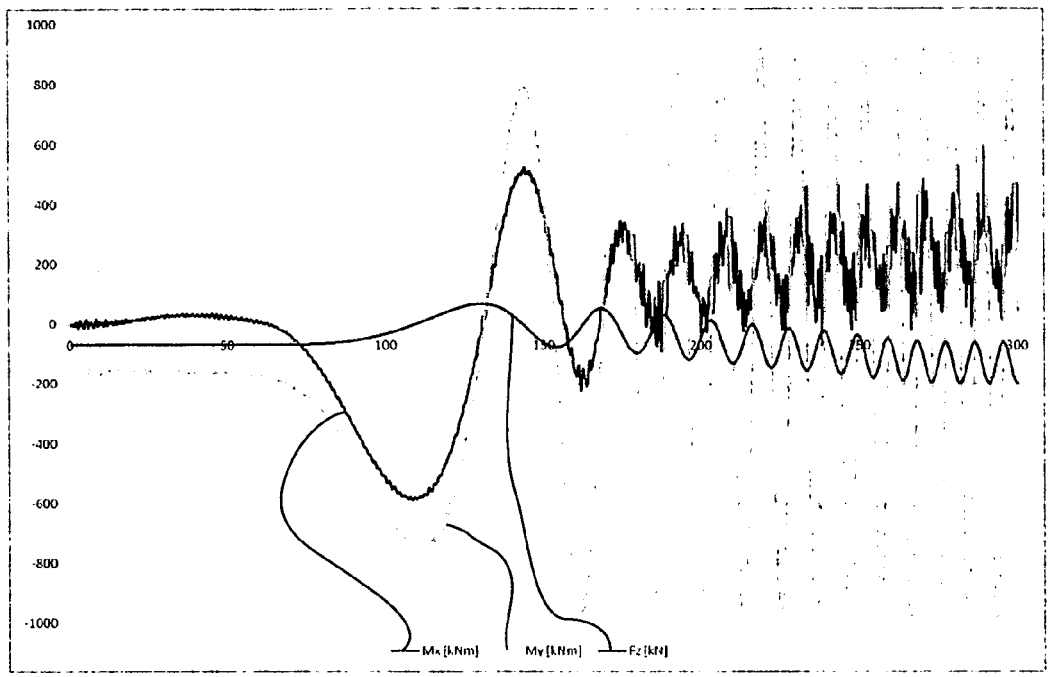
FIG. 10 shows simulated gravitational and inertia loads as a function of time.
Figure 11:
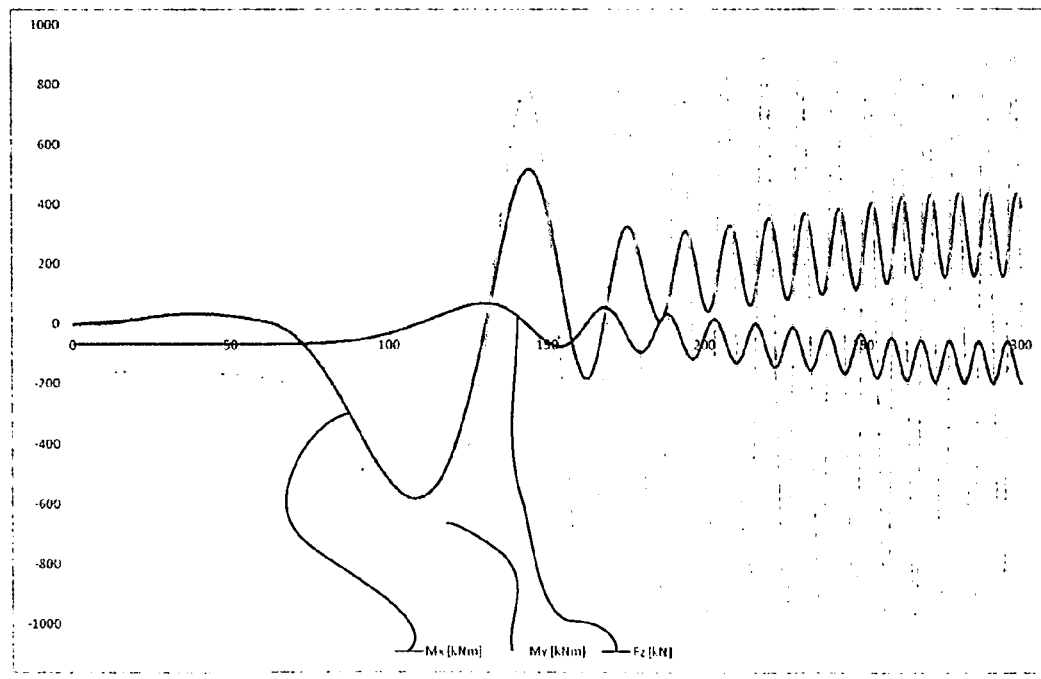
FIG. 11 shows calculated gravitational and inertia loads as a function of time based on the calibration method according to the invention.
Figure 12:
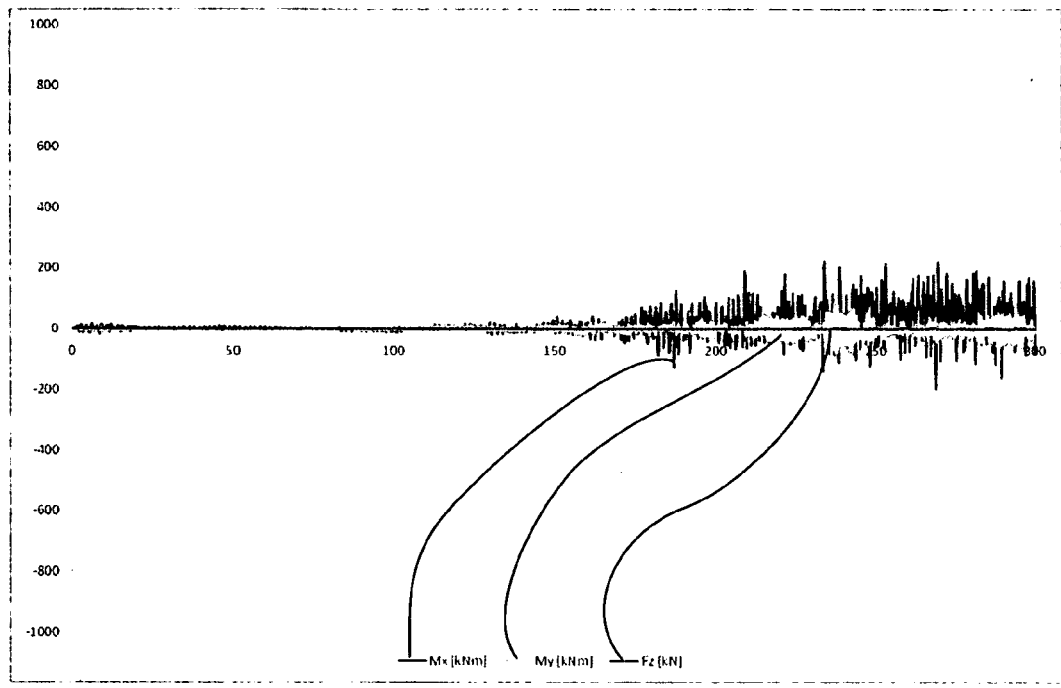
FIG. 12 shows the difference between calculated and simulated gravitational and inertia loads.

FIGS. 10-12 show the results, where only gravitational and inertia loads are shown. Aerodynamic loads are excluded. This is to verify the gravitational and inertia loads part of the model.

As seen in the figures above there is a very good coherence between the calculated and simulated loads from 0 to 150 seconds after start. The differences for the axial force $F_z$ are virtually zero, but for the bending moments $M_x$ and $M_y$ there are significant differences after 150 seconds. At this point the rotor speed is around 1.5 rpm. The differences at higher rotor speeds are mainly caused by the fact that the simulation is aeroelastic. In fact, the entire turbine is elastic; especially the blades are deflecting and vibrating significantly. The deflection of the blade causes a systematic error, which can be seen in the difference in $M_x$ from 200-300 seconds after start, which is slightly more positive than negative. These effects are not taken into account in the current model, where the blade is considered as a rigid body.

6.2 Aerodynamic Loads

Figure 13:
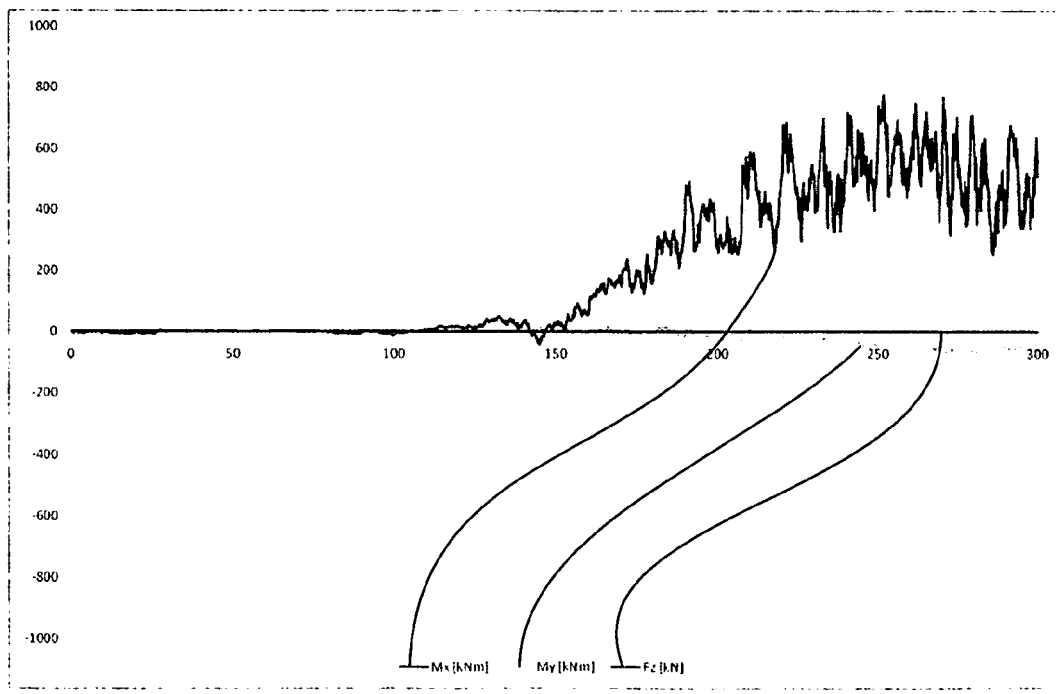
FIG. 13 shows simulated aerodynamic loads as a function of time.
Figure 14:
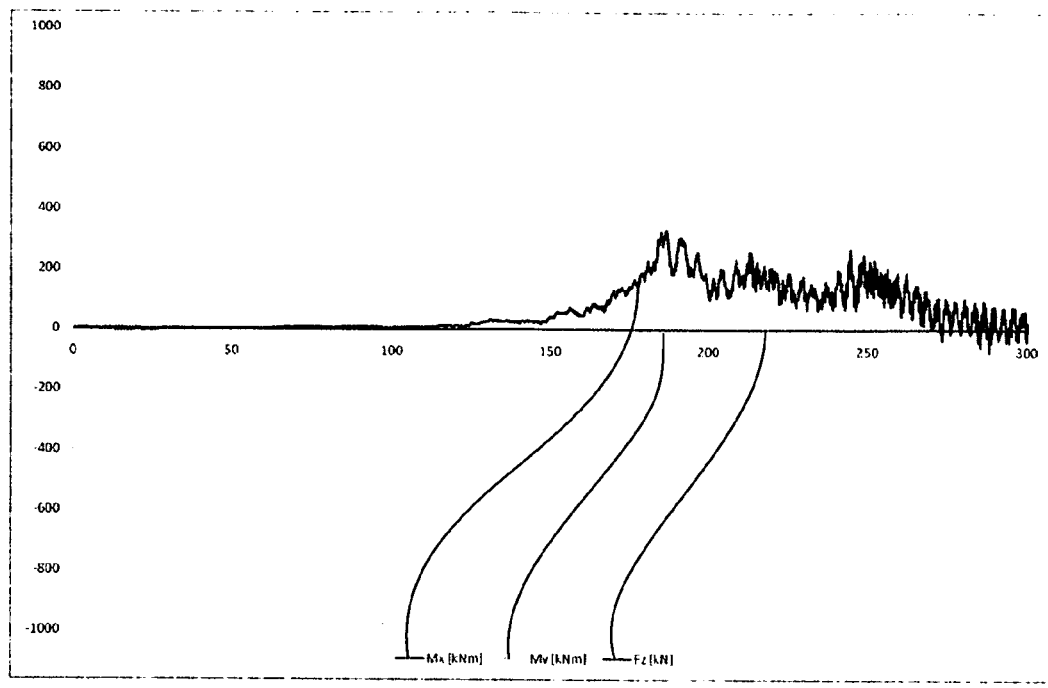
FIG. 14 shows calculated aerodynamic loads as a function of time based on the calibration method according to the invention.
Figure 15:
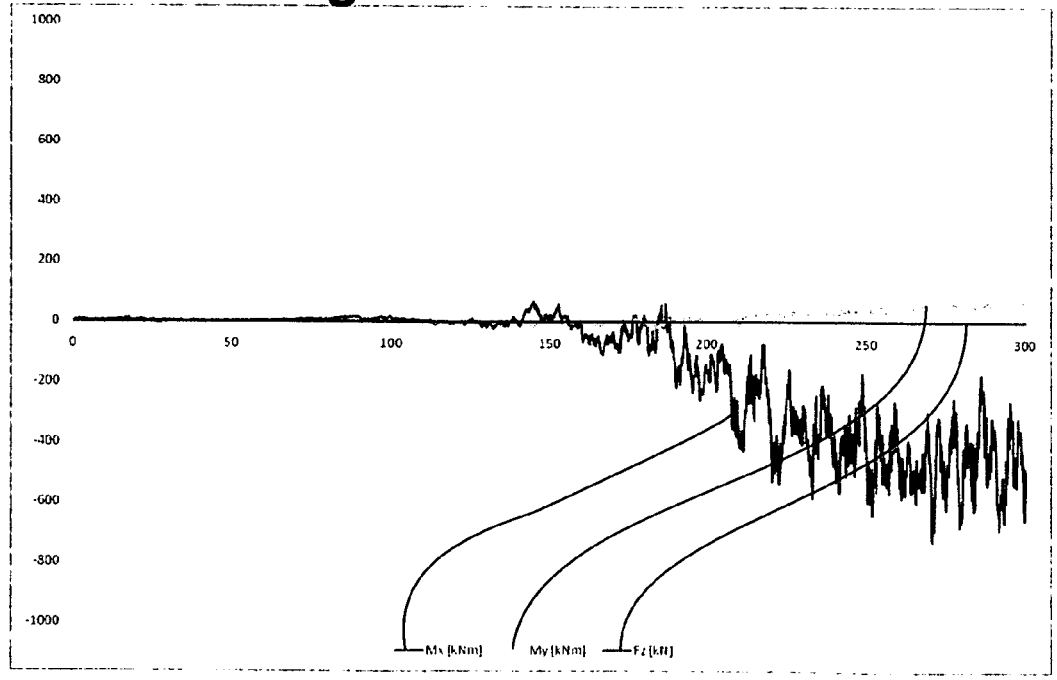
FIG. 15 shows the difference between calculated and simulated aerodynamic loads.

FIGS. 13-15 show the results, where only the aerodynamic loads are shown. Gravitational and inertia loads are excluded. This is to verify the aerodynamic loads part of the model.

As seen in the figures above the aerodynamic loads are very small from 0 to 150 seconds after start, where both the wind speed and the rotor speed is low. The differences for the axial force $F_z$ are exactly zero, because there are no aerodynamic forces in the z-direction, neither in Flex5 nor in the current model. For the bending moments $M_x$ and $M_y$ there are systematic differences after 150 seconds, especially for $M_x$, while the differences for $M_y$ are much smaller. The differences are increasing quadratic with the relative wind speed on the blade; in this case mainly caused by the rotor speed and to a smaller extent the wind speed, but in other cases the opposite is also possible. The aerodynamic model is a very simplified model, where the exact distribution and direction of aerodynamic loads on the blade is not known; only a rough estimate is made based on the rotor acceleration.

7. Uncertainties and Model Restrictions

The torque on the main shaft originating from the generator and/or the mechanical brake has not been modeled. Large errors are expected if the generator is cut-in or the brake is activated. Therefore, the current model should not be used when the generator is cut-in or the brake is activated.

The main uncertainty in the current model is the aerodynamic model. As seen in FIG. 15 the differences are large after 150 seconds of the simulation, especially for the flap moment. Because the aerodynamic loads increase quadratic with the relative wind speed on the blade, the aerodynamic model has only reasonable accuracy at low wind speeds and low rotor speeds.

The uncertainty at high relative wind speed on the blade can be explained by the structure of the aerodynamic model. In the aerodynamic model the exact distribution and direction of aerodynamic loads on the blade is not known. The distribution of loads is dependent on the distribution of the local relative velocity, which may vary significantly with time due to turbulence, wind shear, yaw error, rotor tilt, terrain slope etc. The aerodynamic model assumes the same load distribution on all three blades, but in general the loads can differ significantly. In this case, the aerodynamic model fails to make a good estimate on the aerodynamic loads on each individual blade.

Therefore, the aerodynamic model may have large uncertainties in case of high wind and/or high rotor speed combined with non-ideal operating conditions such as high turbulence, wind shear, yaw error, rotor tilt, terrain slope etc. The errors by the aerodynamic model are sometimes positive, and sometimes negative. It is expected, that the errors more or less cancel out over time, which helps improving the general reliability of the model.

In eq. 5.59 there is an assumption of the direction of the aerodynamic moment. If the direction is parallel to the rotor plane, the tangent function goes towards ±infinity, which is physically impossible. The model is increasingly inaccurate if $\theta - \theta_{aero.} \approx \pm 90°$, which is the case at very low pitch angles (pitch angles typically around −15° to 0°). Therefore, the model should be used with great attention if the pitch angle is low.

In all cases, the aerodynamic model uncertainty is larger for the flapwise bending moment than for the edgewise bending moment and larger for cross sections closer to the tip.

In the current model the turbine is assumed to be rigid, and especially the blade is assumed to be a rigid body. Vibrations in the turbine and the blades are not taken into account, but are expected to cancel out over a short time. However, in case of large deflections of the blade, a systematic error is introduced caused by movement of the centre of gravity and centrifugal stiffening of the blade. This can be seen in FIG. 12, where the difference in $M_x$ from 200-300 seconds after start is slightly more positive than negative. Large deflections of the blade are caused by aerodynamic loads, which increase quadratic with the relative wind speed on the blade: Therefore, the model is increasingly uncertain at high wind speeds or high rotor speeds.

In the inertia loads model yawing of the turbine has not been taken into account. Therefore, an error would be expected in case the turbine is yawing. It is expected that this error is relatively low and will more or less cancel out over time.

Furthermore, the uncertainty of the model is directly dependent on the uncertainty of the blade properties, such as mass, static moments, and mass moments and products of inertia. In case of ice covered blades, these properties can change significantly, and therefore the model is not valid in case of ice covered blades. Also the axial stiffness of the blade must be known.

In the model it is assumed that the rotor is exactly mass balanced. That means the blades must be balanced to have the same static moments.

The sensors may not be placed in (or close to) the elastic centre, otherwise the sensors will not react on bending of the blade. Also, both sensors in one cross section may not be placed in (or close to) the same (or opposite) direction from the elastic centre, otherwise it will be impossible to distinguish between flapwise and edgewise bending moments. Ideally, the sensors should be placed in directions that are around 90° displaced.

Finally, it should be mentioned, that if the rotor speed is not a known input parameter, it can be found simply as the time derivative of the rotor azimuth angle. Similarly, the rotor acceleration can be found as the time derivative of the rotor speed. The same applies for the pitch angle, pitch rate and pitch acceleration, respectively. In practice, differentiation will intensify the uncertainty of the original variable. Therefore, it must be thoroughly considered, if an uncertainty or a low resolution of the original variable demands some filtration or smoothing of the result.

8. Filtration of Data

Due to the uncertainties and model restrictions as described in section 7 the model is only reliable under certain operating conditions. In principle, the data logger is continuously logging the measurements from the sensors all the time, whether the turbine is operating or not. Now, the task is to filter the data in such a manner, that data logged at operating conditions giving the most reliable results are kept, while the data that would give the most unreliable results are discarded.

A number of time simulations that represent various operating conditions of interest for this purpose have been carried out using the aeroelastic code Flex5 (see table 8.1).

TABLE 8.1

Parameters for the time simulations.

| Simulation # | Time simulated [s] | Mean wind speed [m/s] | Turbulence intensity [—] | Initial azimuth angle [°] | Initial pitch angle [°] | Pitch rate [°/s] |
|---|---|---|---|---|---|---|
| 1 | 300 | 2.5 | 0.44 | 0 | 90 | −0.5 |
| 2 | 200 | 4 | 0.35 | 90 | 90 | −0.5 |
| 3 | 200 | 6 | 0.28 | 180 | 90 | −0.5 |
| 4 | 200 | 8 | 0.25 | 270 | 90 | −0.5 |
| 5 | 200 | 4 | 0.35 | 0 | 90 | −1 |
| 6 | 150 | 6 | 0.28 | 90 | 90 | −1 |
| 7 | 100 | 8 | 0.25 | 180 | 90 | −1 |
| 8 | 300 | 4 | 0.35 | 270 | 90 | −2 |
| 9 | 150 | 6 | 0.28 | 0 | 90 | −2 |
| 10 | 100 | 8 | 0.25 | 90 | 90 | −2 |
| 11 | 300 | 4 | 0.35 | 180 | 90 | −4 |
| 12 | 150 | 6 | 0.28 | 270 | 90 | −4 |
| 13 | 100 | 8 | 0.25 | 0 | 90 | −4 |
| 14 | 100 | 12 | 0.20 | 90 | 90 | −1 |
| 15 | 100 | 16 | 0.17 | 180 | 90 | −1 |
| 16 | 100 | 20 | 0.16 | 270 | 90 | −1 |
| 17 | 100 | 24 | 0.14 | 0 | 90 | −1 |
| 18 | 100 | 16 | 0.17 | 90 | 80 | 0 |
| 19 | 100 | 24 | 0.14 | 180 | 80 | 0 |
| 20 | 100 | 50 | 0.10 | 270 | 80 | 0 |

Simulations #1 to 17 are different cases, where the turbine is starting up at different wind speeds and with different pitch rates. An example (simulation #1) is shown in FIG. 9. Simulations #18 to 20 are cases, where the turbine is idling at high wind speeds.

The azimuth angle $\psi$, rotor speed $\omega$, pitch angle $\theta$ and pitch rate from the simulations are used as input for the current model to predict the cross sectional loads in the profile coordinate system. The predicted loads are compared with the loads from the time simulations (see FIGS. 16*a-c*). Each dot represents the loads for a given time step. The sampling frequency here is 10 Hz. The total time simulated were 3,150 seconds, corresponding to 31,500 samples.

Figure 16A:
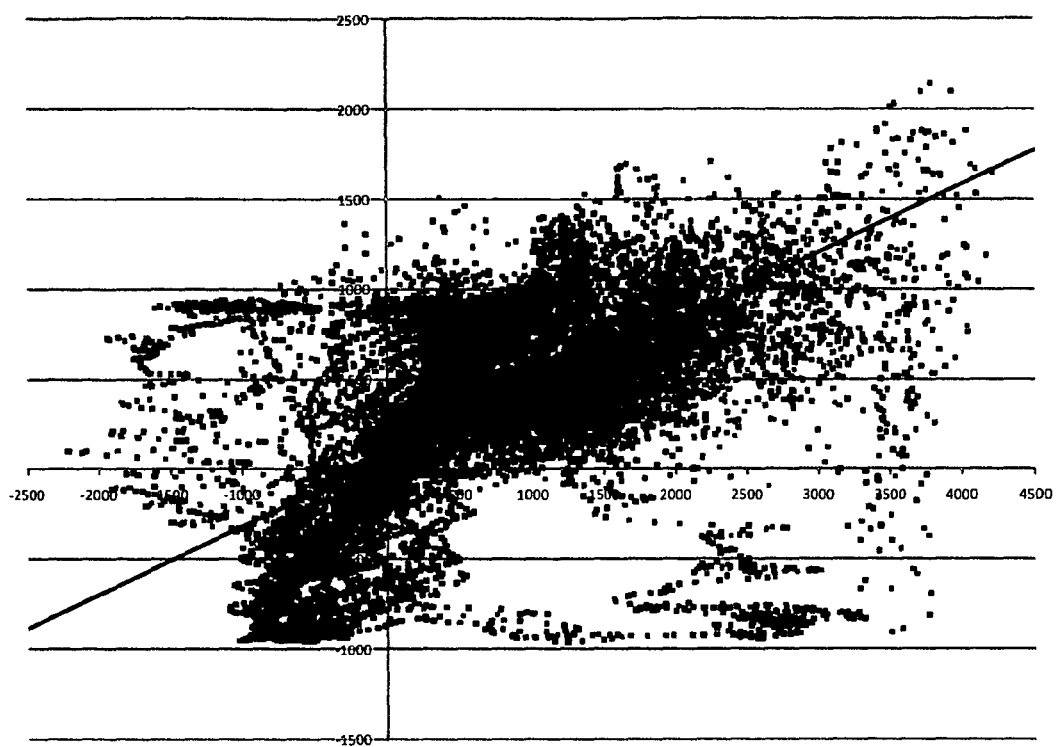
FIG. 16a-c show calculated loads versus simulated loads without data filtration.
Figure 16B:
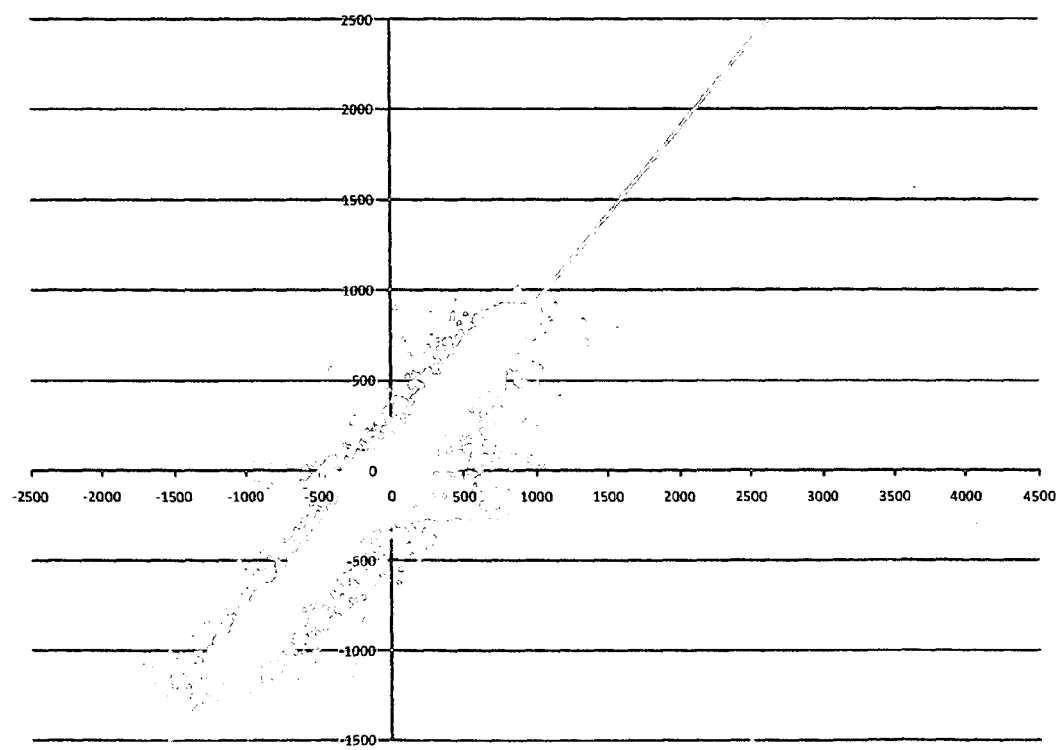
Figure 16C:
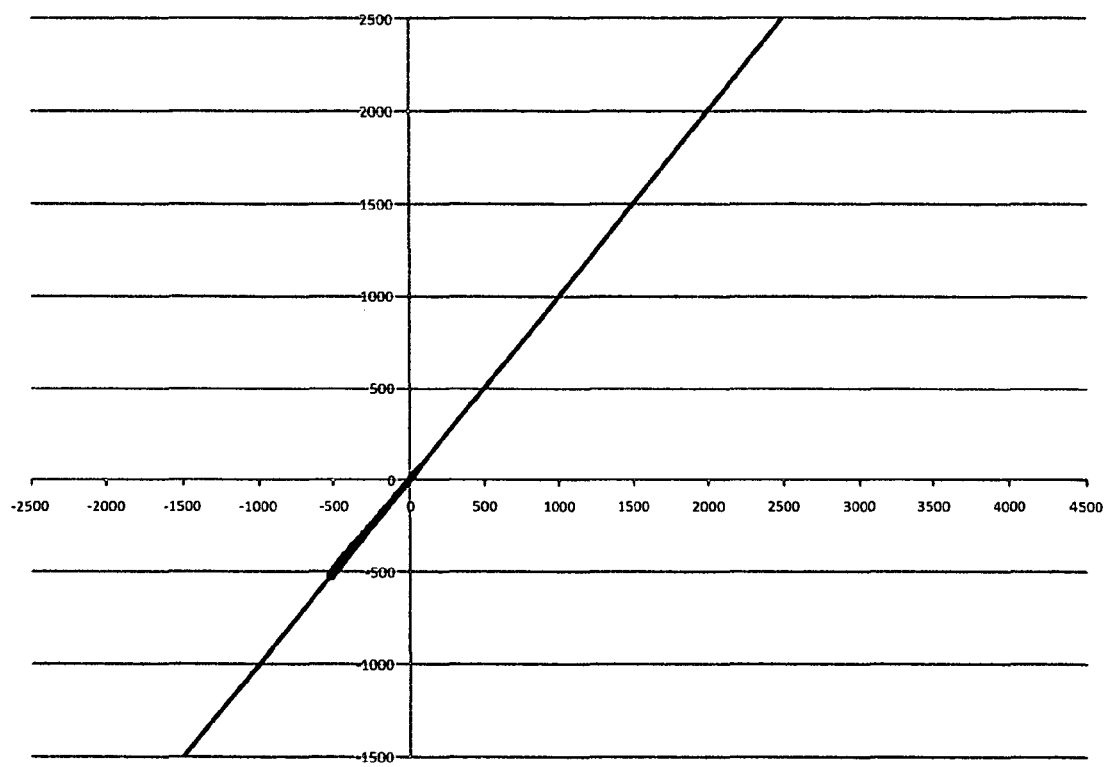

As seen in FIGS. 16*a-c*, the data points are scattered. Especially the flap moment $M_x$ has a low coherence, but also the edge moment $M_y$ has some significant scatter. The axial force $F_z$ is very well predicted. Ideally, all the data points should be placed on the straight line y=x with the square of correlation coefficient $R^2=1$. The scatter is caused by the fact that the current model is only reliable under certain operating conditions (see section 7).

Based on known parameters, the data filtration should keep only data points that are reliable, i.e. data points close to line y=x. It is impossible to make a perfect filter that keeps all the reliable data and discards all the unreliable data. In practice, there will always be some overlap, but the most important thing is to discard on the whole all the unreliable data, even if some of the reliable data thereby are discarded. But a sufficient amount of data should still remain to make a reliable and accurate calibration.

8.1 Filtration Boundary Conditions

The current model is not valid if the generator is cut-in. There is no direct indication of when the generator is cut-in or cut-out. But the generator is only cut-in if the rotor speed is above the generator cut-in speed (6.8 rpm). Therefore all data with generator speed above generator cut-in speed (with a reasonable safety margin because of variable generator speed) are discarded.

$\omega < 0.6$ rad/s.  (8.1)

The current model is also not valid if the brake is activated. There is no direct indication of when the brake is activated. But if the brake is activated, a rapid deceleration of the rotor is expected. Therefore, data with highly negative rotor acceleration must be discarded.

$$\dot{\omega} > -0.05 \text{ rad/s}^2. \quad (8.2)$$

If the brake is activated and the rotor has stopped there is no longer a deceleration. But the brake will still outbalance the aerodynamic torque, so these data should also be discarded. As a precaution all data with a rotor speed close to zero must be discarded. This also avoids logging excessive amount of data at the same rotor position, which could bias the calibration.

$$-0.001 \text{ rad/s} < \omega < 0.001 \text{ rad/s}. \quad (8.3)$$

Assuming that the generator is cut-out and the brake is not activated, a high rotor acceleration (or deceleration) is only possible if there is a large aerodynamic torque on the rotor. This is a situation where the aerodynamic model is uncertain. Therefore, data with high rotor acceleration (or deceleration) are discarded.

$$-0.005 \text{ rad/s}^2 < \dot{\omega} < 0.005 \text{ rad/s}^2. \quad (8.4)$$

The aerodynamic model is uncertain when the relative wind speed on the blade is high. Also the assumption that the blades are rigid bodies does not hold in this case, because the blades are bending and vibrating. There is no direct indication of either the relative wind speed on the blade or the free wind speed at all. If the angle of attack is low (within ±10°) the relative wind speed on the blade is almost parallel to the x-axis of the blade coordinate system. This is often the case in most typical operating conditions. In this case the approximation in eq. 8.5 applies, and an indirect indication of the relative wind speed on the blade is given. Data with high values should be discarded.

$$\frac{v_{rel}}{r} \approx \frac{\omega}{\cos\theta} < 0.15 \text{ rad/s}. \quad (8.5)$$

Eq. 8.5 is increasingly uncertain close to the asymptote at θ=90°. If the turbine is in pause or stop mode, there is a risk that the wind speed is high, without any method to detect it because the pitch angle is close to 90° and eq. 8.5 does not apply. Therefore, data with high pitch angles are discarded.

$$\theta < 75°. \quad (8.6)$$

Eq. 5.59 is increasingly uncertain close to the asymptote at $\theta - \theta_{aero.} = -90°$. Therefore, data with low pitch angles are discarded.

$$\theta > 0°. \quad (8.7)$$

Figure 17A:
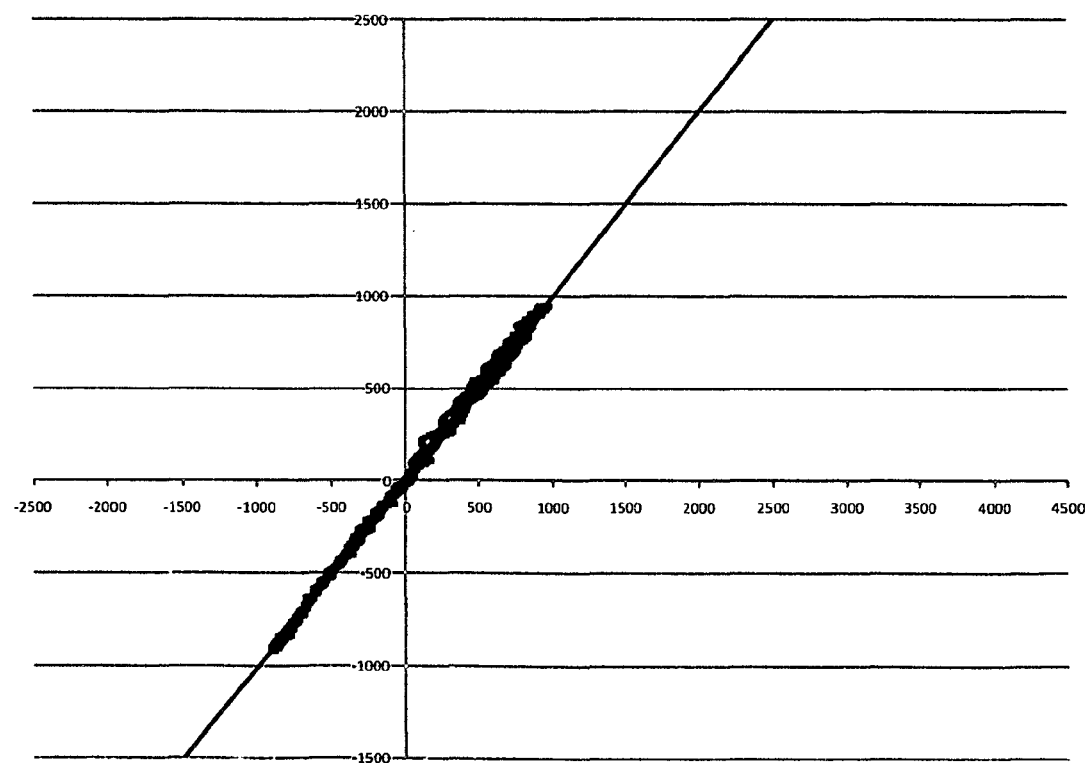
FIG. 17a-c show calculated loads versus simulated loads after data filtration.
Figure 17B:
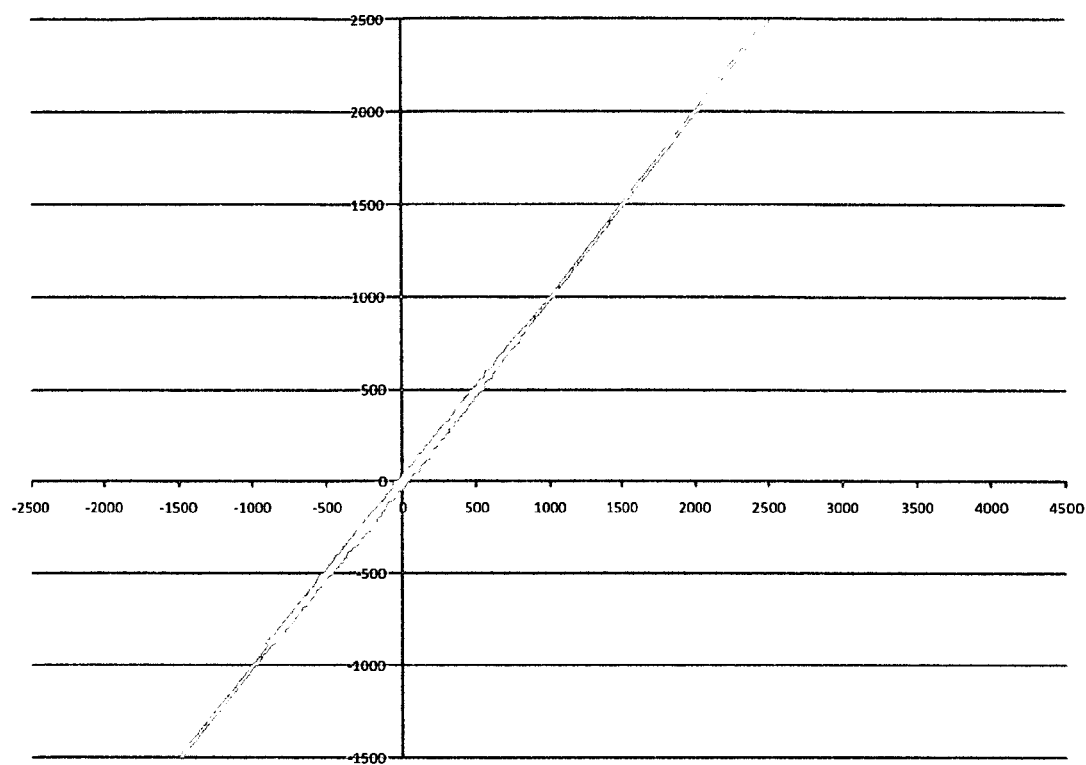
Figure 17C:
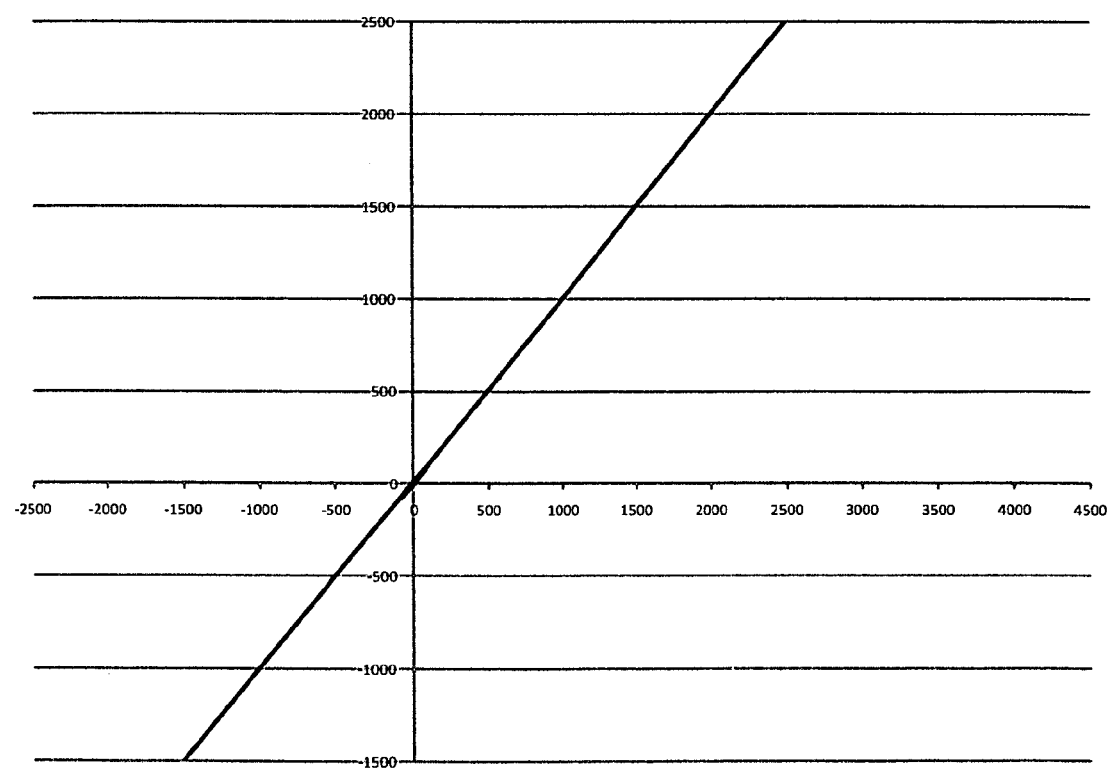

Using the filtration of the data described in eq. 8.1 to 8.7, the data points giving a poor prediction of the loads disappear and there is a much better coherence between the loads predicted by the current model and the loads simulated by Flex5 (see FIGS. 17a-c).

The loads predicted by the current model are still not perfectly exact, because there still remains a little bit of scatter, mainly on the flap moment $M_x$. However, if there are enough data points, the errors will more or less average out, and a very good curve fit can be made.

9. Data Requirements for Calibration

This section describes how many samples are needed before carrying out a reliable calibration.

The sample mean and standard deviation of strain at $i^{th}$ sensor position can be calculated by eq. 9.1 and 9.2, respectively.

$$\bar{\varepsilon}_i = \frac{1}{n} \cdot \sum_{j=1}^{n} \varepsilon_{i,j}, \quad (9.1)$$

$$s_i = \sqrt{\frac{1}{n-1} \cdot \sum_{j=1}^{n} (\varepsilon_{i,j} - \bar{\varepsilon}_i)^2}. \quad (9.2)$$

In samples collected for the calibration, the strain is mainly caused by gravity. Assuming that the strain is exclusively caused by gravity, and the azimuth and pitch angles are evenly distributed, the expected sample standard deviation of strain would be $$s_{expected,i} = \frac{-(s_z - m \cdot z) \cdot g \cdot \sqrt{\left(\frac{x_{sensor,i} - x_{e.c.}}{EI_{edge}}\right)^2 + \left(\frac{y_{sensor,i} - y_{e.c.}}{EI_{flap}}\right)^2}}{2} \quad (9.3)$$

If the sample standard deviation of strain is smaller than expected, means that relatively few samples have a strain close to the extreme values. On the other hand, if the sample standard deviation of strain is greater than expected, means that relatively many samples have a strain close to the extreme values. The latter is better, because if most of the samples are huddled together at small strain levels, the curve fit would be more uncertain than if most of the samples are at extreme strain levels. Therefore, it is suggested that the minimum needed number of samples depend on the ratio between the expected sample standard deviation and the sample standard deviation of strain. Furthermore, it is suggested that the needed number of samples depend on the sampling frequency. It is suggested that the following inequality is fulfilled for both sensors before the calibration is carried out.

$$n \geq n_{min,i} = 1{,}000 \text{ s} \cdot (f_s + 10 \text{ Hz}) \cdot \left(\frac{s_{expected,i}}{s_i}\right)^4, \quad (9.4)$$

Depending on the sampling frequency and the spread of data, this corresponds to a little more than 1,000 seconds of high quality data that has passed the filtration described in section 8. After getting some experience with real measurement data, the criterion in the above inequality could be modified to fit new requirements.

10. Data Fit for Calibration

When the inequality in eq. 9.4 is fulfilled for both sensors in a cross section, the actual calibration can be carried out.

The strains at the sensor positions can theoretically be calculated by $$\varepsilon_i = R_{x,i} \cdot M_{x,p.s.} + R_{y,i} \cdot M_{y,p.s.} - \frac{F_{z,p.s.}}{AE}, \quad (10.1)$$

where the relative strains are $$R_{x,i} = -\frac{y_{sensor,i} - y_{e.c.}}{EI_{flap}}, \quad (10.2)$$

-continued $$R_{y,i} = \frac{x_{sensor,i} - x_{e.c.}}{EI_{edge}}. \quad (10.3)$$

With two sensors in a cross section, eq. 10.1 can be rearranged into the linear equations $$M_{x,p.s.} = m_{x,1} \cdot \left(\varepsilon_1 + \frac{F_{z,p.s.}}{AE}\right) + m_{x,2} \cdot \left(\varepsilon_2 + \frac{F_{z,p.s.}}{AE}\right) + b_x, \quad (10.4)$$

$$M_{y,p.s.} = m_{y,1} \cdot \left(\varepsilon_1 + \frac{F_{z,p.s.}}{AE}\right) + m_{y,2} \cdot \left(\varepsilon_2 + \frac{F_{z,p.s.}}{AE}\right) + b_y. \quad (10.5)$$

Eq. 10.4 and 10.5 are the general equations for the planes describing $M_{x,p.s.}$ and $M_{y,p.s.}$, respectively, as functions of the independent variables $$\left(\varepsilon_1 + \frac{F_{z,p.s.}}{AE}\right) \text{ and } \left(\varepsilon_2 + \frac{F_{z,p.s.}}{AE}\right).$$

The relative moments $m_{x,i}$ and $m_{y,i}$ are the slopes of the planes in the respective directions and at first the constants $b_x$ and $b_y$ should be equal to zero, but here they are included to take into account any offset e.g. caused by pre-stressed sensors etc.

The connection between the relative strains and the relative moments is $$R_{x,1} = \frac{m_{y,2}}{m_{x,1} \cdot m_{y,2} - R_{y,1} \cdot R_{x,2}}, \quad (10.6)$$

$$R_{y,1} = \frac{-m_{x,2}}{m_{x,1} \cdot m_{y,2} - R_{y,1} \cdot R_{x,2}}, \quad (10.7)$$

$$R_{x,2} = \frac{-m_{y,1}}{m_{x,1} \cdot m_{y,2} - R_{y,1} \cdot R_{x,2}}, \quad (10.8)$$

$$R_{y,2} = \frac{m_{x,1}}{m_{x,1} \cdot m_{y,2} - R_{y,1} \cdot R_{x,2}}, \quad (10.9)$$

or correspondingly $$m_{x,1} = \frac{R_{y,2}}{R_{x,1} \cdot R_{y,2} - R_{x,2} \cdot R_{y,1}}, \quad (10.10)$$

$$m_{x,2} = \frac{-R_{y,1}}{R_{x,1} \cdot R_{y,2} - R_{x,2} \cdot R_{y,1}}, \quad (10.11)$$

$$m_{y,1} = \frac{-R_{x,2}}{R_{x,1} \cdot R_{y,2} - R_{x,2} \cdot R_{y,1}}, \quad (10.12)$$

$$m_{y,2} = \frac{-R_{x,1}}{R_{x,1} \cdot R_{y,2} - R_{x,2} \cdot R_{y,1}}. \quad (10.13)$$

While the data logger is sampling the measured strains, for each data point that passes the filtration, the following variables must be saved: The measured strains $\varepsilon_1$ and $\varepsilon_2$ and the loads $F_{z,p.s.}$, $M_{x,p.s.}$ and $M_{y,p.s.}$ as calculated by eq. 5.66-5.68.

Now it is possible to find the coefficients $m_{x,1}$, $m_{x,2}$, $m_{y,1}$, $m_{y,2}$, $b_x$ and $b_y$ to obtain the planes (eq. 10.4 and 10.5) that best fit the calculated bending moments $M_{x,p.s.}$ and $M_{y,p.s.}$. The coefficients can be found using e.g. the method of least squares. This method will not be described here, because it is beyond the scope of this document and well known to the skilled person.

11. Equations to Use after Calibration

When the system is used to monitor the blade loads after a successful calibration of the sensors, it should be noted that calculating the three cross sectional load components $F_{z,p.s.}$, $M_{x,p.s.}$ and $M_{y,p.s.}$ from only two measurements $\varepsilon_1$ and $\varepsilon_2$ is impossible. One more input is needed to set up an additional equation, to make it possible to solve the system of equations.

Here it is proposed simply to use the axial force $F_{z,p.s.}$ calculated by eq. 5.66, assuming that the uncertainty introduced by this is quite small, even for operating conditions at high wind and rotor speed and with the generator cut-in. Now that $F_{z,p.s.}$ is a known quantity, the bending moments $M_{x,p.s.}$ and $M_{y,p.s.}$ can be calculated directly by eq. 10.4 and 10.5.

It should be noted that the resulting loads are in the local profile coordinate system that includes also the deformation of the blade. If the loads are needed in another coordinate system, e.g. the blade coordinate system, the loads must be transformed correspondingly.

12. Results

The filtered data shown in FIG. 8.2 does not fulfill the inequality in eq. 9.4 for sensor 1, i.e. for instance the first flap sensor 21, but for sensor 2, i.e. for instance the edge sensor 22, there are enough samples (see table 12.1).

TABLE 12.1

Figures for evaluating the requirements for calibration of the sensors.

|  | Sensor 1 | Sensor 2 |
|---|---|---|
| $f_s$ |  | 10 Hz |
| $s_{i, expected}$ | 2.54e−4 | 2.16e−4 |
| $s_i$ | 2.34e−4 | 2.75e−4 |
| $n_{min, i}$ | 27,915 | 7,522 |
| N |  | 11,349 |

Even though the number of samples is not sufficient according to eq. 9.4, the calibration as described in section 10 is still carried out here, just to show what the results would be (see tables 12.2 and 12.3).

TABLE 12.2

Calibration results for regression of $M_{x,p.s.}$.

|  | Best fit | True value | Difference |
|---|---|---|---|
| $m_{x,1}$ | −2.094e+9 Nm | −2,079e+9 Nm | +0.70% |
| $m_{x,2}$ | 4.954e+8 Nm | 4.712e+8 Nm | +5.15% |
| $b_x$ | −2,434 Nm | 0 Nm | −2,434 Nm |
| $r^2$ | 0.9951 |  |  |
| $\hat{\sigma}_{M_x}$ | 26,515 Nm |  |  |

The results in table 12.2 correspond to a total error in $M_{x,p.s.}$ of +0.24% of the true moment plus an offset of −2.4 kNm.

TABLE 12.3

Calibration results for regression of $M_{y,p.s.}$.

|  | Best fit | True value | Difference |
|---|---|---|---|
| $m_{y,1}$ | 1.130e+9 Nm | −1.133e+9 Nm | −0.18% |
| $m_{y,2}$ | −2.747e+9 Nm | −2.749e+9 Nm | −0.08% |
| $b_y$ | −2,233 Nm | 0 Nm | −2,233 Nm |
| $r^2$ | 0.9997 | | |
| $\hat{\sigma}_{M_y}$ | 9,112 Nm | | |

The results in table 12.3 correspond to a total error in $M_{y,p.s.}$ of −0.06% of the true moment plus an offset of −2.2 kNm.

13. Future Work

Yawing of the turbine is not taken into account in the current model because the yaw angle is probably not an easily accessible parameter to log. However, yawing would change the blade loads, especially if the rotor speed is moderate or high. The impact of this has not yet been investigated. If it is possible to get access to the yaw angle, it would be relevant to update the current model to take into account inertia loads originating from yawing. Otherwise, it would be relevant to investigate the typical yaw activity of a real turbine, and find out what is the impact of this.

The parameters for the aerodynamic model should be fitted with field measurements from a real wind turbine to see if they can be improved. The simplified aerodynamic model is the weak part of the current model, and it should be considered if it is possible to improve it by means of some other fairly simple equations.

Another major uncertainty is the assumption of stiff blades. To further improve the current model, it would be necessary to take into account deformation and vibration of the elastic blades. However, this would significantly increase the complexity of the model.

After getting some experience with field measurements, it should be investigated if the filtration boundary conditions must be changed. Also new types of filters could be added if relevant, e.g. some intelligent filters taking more than one parameter and more than one condition into account. Instead of discarding data that does not pass the filtration, including a weighted contribution of these data could be considered. The weight should depend on to what extent the data meets the filtration criteria.

14. Conclusions

A method for a fully automatic on-site calibration of load sensors on a wind turbine blade was presented. It is not necessary to stop the turbine for the calibration. A data logger is logging relevant data for the calibration while the turbine is running normally. Also no human interaction is necessary to perform the calibration.

The concept requires at least two strain sensors in each blade cross section. The data logger must log at least the azimuth angle, pitch angle together with some calculated values. For the calculations, various turbine and blade properties such as blade mass, mass moment, moments of inertia etc. are needed.

Only data logged at relatively low wind and rotor speeds and when the generator is cut-out are usable. This will typically be when the turbine is idling or starting up at low wind speeds. The remaining data are discarded. Accumulated usable data from a little more than 1,000 seconds is suggested in order to perform a reliable calibration.

In order to test the concept, some time simulations of the REpower 5M turbine with LM 61.5 P2 blades were carried out using the aeroelastic code Flex5. The results from the time simulations were treated as if they were measurements from the strain sensors on a real wind turbine blade, and subsequently used as input for the calibration.

The results showed that it is possible to use the concept for calibrating the load sensors. The maximum calibration errors were 0.24% for the flapwise bending moment and −0.06% for the edgewise bending moment, with offsets around −2 kNm.

The invention has been described with reference to a preferred embodiment. However, the scope of the invention is not limited to the illustrated embodiment, and alterations and modifications can be carried out without deviating from the scope of the invention.

15. List of Reference Numerals 2 wind turbine
4 tower
6 nacelle
8 hub
10 blade
14 blade tip
16 blade root
18 leading edge
20 trailing edge
21 first flap sensor
22 first edge sensor
23 first flap sensor
24 first edge sensor
25 first principal bending axis
26 second principal bending axis
27 elastic centre
28 blade coordinate system
29 profile coordinate system
30 root region
32 transition region
34 airfoil region
40 part of wind turbine blade located outside or outboard of first cross-section of the wind turbine blade
42 first cross-section
43 second cross-section
50 longitudinal axis of tower
51 longitudinal axis of main bearing
52 longitudinal axis of first wind turbine blade

| Symbol | Unit | Description |
|---|---|---|
| A | [m²] | Area of cross section |
| $a_1$ | [W] | Linear friction losses in drive train at nominal speed (only mechanical losses) |
| $a_2$ | [W] | Quadratic friction losses in drive train at nominal speed (only mechanical losses) |

-continued

| Symbol | Unit | Description |
|---|---|---|
| $a_3$ | [W] | $3^{rd}$ order friction losses in drive train at nominal speed (only mechanical losses) |
| AE | [Nm$^2$] | Axial stiffness |
| $b_x$ | [Nm] | Constant offset for $M_{x,\,p.s.}$ |
| $b_y$ | [Nm] | Constant offset for $M_{y,\,p.s.}$ |
| B | [-] | Number of blades |
| c | [m] | Chord length |
| $EI_{edge}$ | [Nm$^2$] | Edgewise bending stiffness |
| $EI_{flap}$ | [Nm$^2$] | Flapwise bending stiffness |
| $f_F$ | [-] | Multiplication factor for aerodynamic force |
| $f_M$ | [-] | Multiplication factor for aerodynamic moment |
| $f_s$ | [Hz] | Sampling frequency |
| $F_{x,\,b.b.s.,\,aero.}$ | [N] | Aerodynamic force in x-direction (blade bearing coordinate system) |
| $F_{x,\,b.s.,\,Coriolis}$ | [N] | Coriolis force in x-direction (blade coordinate system) |
| $F_{x,\,b.s.,\,inertia}$ | [N] | Inertia force in x-direction (blade coordinate system) |
| $F_{x,\,b.s.,\,pitch\,acc.}$ | [N] | Force in x-direction caused by pitch acceleration (blade coordinate system) |
| $F_{x,\,b.s.,\,pitch\,centrif.}$ | [N] | Centrifugal force in x-direction caused by pitch speed (blade coordinate system) |
| $F_{x,\,b.s.,\,rotor\,acc.}$ | [N] | Force in x-direction caused by rotor acceleration (blade coordinate system) |
| $F_{x,\,b.s.,\,rotor\,centrif.}$ | [N] | Centrifugal force in x-direction caused by rotor speed (rotor coordinate system) |
| $F_{y,\,b.s.,\,Coriolis}$ | [N] | Coriolis force in y-direction (blade coordinate system) |
| $F_{y,\,b.s.,\,inertia}$ | [N] | Inertia force in y-direction (blade coordinate system) |
| $F_{y,\,b.s.,\,pitch\,acc.}$ | [N] | Force in y-direction caused by pitch acceleration (blade coordinate system) |
| $F_{y,\,b.s.,\,pitch\,centrif.}$ | [N] | Centrifugal force in y-direction caused by pitch speed (blade coordinate system) |
| $F_{y,\,b.s.,\,rotor\,acc.}$ | [N] | Force in y-direction caused by rotor acceleration (blade coordinate system) |
| $F_{y,\,b.s.,\,rotor\,centrif.}$ | [N] | Centrifugal force in y-direction caused by rotor speed (rotor coordinate system) |
| $F_{z,\,b.b.s.,\,aero.}$ | [N] | Aerodynamic force in z-direction (blade bearing coordinate system) |
| $F_{z,\,b.s.}$ | [N] | Force in z-direction (blade coordinate system) |
| $F_{z,\,b.s.,\,aero.}$ | [N] | Aerodynamic force in z-direction (blade coordinate system) |
| $F_{z,\,b.s.,\,grav.}$ | [N] | Gravitational force in z-direction (blade coordinate system) |
| $F_{z,\,b.s.,\,Coriolis}$ | [N] | Coriolis force in z-direction (blade coordinate system) |
| $F_{z,\,b.s.,\,inertia}$ | [N] | Inertia force in z-direction (blade coordinate system) |
| $F_{z,\,b.s.,\,pitch\,acc.}$ | [N] | Force in z-direction caused by pitch acceleration (blade coordinate system) |
| $F_{z,\,b.s.,\,pitch\,centrif.}$ | [N] | Centrifugal force in z-direction caused by pitch speed (blade coordinate system) |
| $F_{z,\,b.s.,\,rotor\,acc.}$ | [N] | Force in z-direction caused by rotor acceleration (blade coordinate system) |
| $F_{z,\,b.s.,\,rotor\,centrif.}$ | [N] | Centrifugal force in z-direction caused by rotor speed (rotor coordinate system) |
| $F_{z,\,p.s.}$ | [N] | Force in z-direction (profile coordinate system) |
| $F_{z,\,r.s.,\,rotor\,acc.}$ | [N] | Force in z-direction caused by rotor acceleration (rotor coordinate system) |
| g | [m/s$^2$] | Gravitational acceleration |
| $g_{x,\,b.s.}$ | [m/s$^2$] | Gravitational acceleration in x-direction (blade coordinate system) |
| $g_{x,\,b.b.s.}$ | [m/s$^2$] | Gravitational acceleration in x-direction (blade bearing coordinate system) |
| $g_{x,\,m.b.s.}$ | [m/s$^2$] | Gravitational acceleration in x-direction (main bearing coordinate system) |
| $g_{x,\,r.s.}$ | [m/s$^2$] | Gravitational acceleration in x-direction (rotor coordinate system) |
| $g_{x,\,n.s.}$ | [m/s$^2$] | Gravitational acceleration in x-direction (nacelle coordinate system) |
| $g_{y,\,b.s.}$ | [m/s$^2$] | Gravitational acceleration in y-direction (blade coordinate system) |
| $g_{y,\,b.b.s.}$ | [m/s$^2$] | Gravitational acceleration in y-direction (blade bearing coordinate system) |
| $g_{y,\,m.b.s.}$ | [m/s$^2$] | Gravitational acceleration in y-direction (main bearing coordinate system) |
| $g_{y,\,n.s.}$ | [m/s$^2$] | Gravitational acceleration in y-direction (nacelle coordinate system) |
| $g_{y,\,r.s.}$ | [m/s$^2$] | Gravitational acceleration in y-direction (rotor coordinate system) |
| $g_{z,\,b.s.}$ | [m/s$^2$] | Gravitational acceleration in z-direction (blade coordinate system) |
| $g_{z,\,b.b.s.}$ | [m/s$^2$] | Gravitational acceleration in z-direction (blade bearing coordinate system) |
| $g_{z,\,m.b.s.}$ | [m/s$^2$] | Gravitational acceleration in z-direction (main bearing coordinate system) |
| $g_{z,\,n.s.}$ | [m/s$^2$] | Gravitational acceleration in z-direction (nacelle coordinate system) |
| $g_{z,\,r.s.}$ | [m/s$^2$] | Gravitational acceleration in z-direction (rotor coordinate system) |
| $H_{Ox}$ | [kg·m$^2$/s] | Angular momentum in x-direction around fixed point in rotor centre (blade coordinate system) |

-continued

| Symbol | Unit | Description |
|---|---|---|
| $H_{Oy}$ | [kg · m²/s] | Angular momentum in y-direction around fixed point in rotor centre (blade coordinate system) |
| $H_{Oz}$ | [kg · m²/s] | Angular momentum in z-direction around fixed point in rotor centre (blade coordinate system) |
| $\dot{H}_{Ox}$ | [kg · m²/s²] | Time derivative of angular momentum in x-direction around fixed point in rotor centre (blade coordinate system) |
| $\dot{H}_{Oy}$ | [kg · m²/s²] | Time derivative of angular momentum in y-direction around fixed point in rotor centre (blade coordinate system) |
| $i$ | [-] | Sensor number |
| $I_{Oxx}$ | [kg · m²] | Mass moment of inertia in x-direction around fixed point in rotor centre (blade coordinate system) |
| $I_{Oxx, blade}$ | [kg · m²] | Blade mass moment of inertia in x-direction around fixed point in rotor centre (blade coordinate system) |
| $I_{Oxy}$ | [kg · m²] | Mass product of inertia with respect to x- and y-axes around fixed point in rotor centre (blade coordinate system) |
| $I_{Oxy, blade}$ | [kg · m²] | Blade mass product of inertia with respect to x- and y-axes around fixed point in rotor centre (blade coordinate system) |
| $I_{Oxz}$ | [kg · m²] | Mass product of inertia with respect to x- and z-axes around fixed point in rotor centre (blade coordinate system) |
| $I_{Oxz, blade}$ | [kg · m²] | Blade mass product of inertia with respect to x- and z-axes around fixed point in rotor centre (blade coordinate system) |
| $I_{Oyy}$ | [kg · m²] | Mass moment of inertia in y-direction around fixed point in rotor centre (blade coordinate system) |
| $I_{Oyy, blade}$ | [kg · m²] | Blade mass moment of inertia in y-direction around fixed point in rotor centre (blade coordinate system) |
| $I_{Oxx, generator}$ | [kg · m²] | Generator mass moment of inertia around its axis of rotation |
| $I_{Oxx, hub}$ | [kg · m²] | Hub mass moment of inertia around rotor axis |
| $I_{Oxx, rotor}$ | [kg · m²] | Rotor mass moment of inertia around rotor axis (incl. entire drive train) |
| $I_{Oxx, r.s., blade, i}$ | [kg · m²] | Blade mass moment of inertia around rotor axis for the $i^{th}$ blade (rotor coordinate system) |
| $I_{Oyz}$ | [kg · m²] | Mass product of inertia with respect to y- and z-axes around fixed point in rotor centre (blade coordinate system) |
| $I_{Oyz, blade}$ | [kg · m²] | Blade mass product of inertia with respect to y- and z-axes around fixed point in rotor centre (blade coordinate system) |
| $I_{Ozz}$ | [kg · m²] | Mass moment of inertia in z-direction around fixed point in rotor centre (blade coordinate system) |
| $I_{Ozz, blade}$ | [kg · m²] | Blade mass moment of inertia-in z-direction around fixed point in rotor centre (blade coordinate system) |
| $I_{xx}$ | [kg · m²] | Mass moment of inertia in x-direction around blade root (blade coordinate system) |
| $I_{xx, blade}$ | [kg · m²] | Blade mass moment of inertia in x-direction around blade root (blade coordinate system) |
| $I_{xy}$ | [kg · m²] | Mass product of inertia with respect to x- and y-axes around blade root (blade coordinate system) |
| $I_{xy, blade}$ | [kg · m²] | Blade mass product of inertia with respect to x- and y-axes around blade root (blade coordinate system) |
| $I_{xz}$ | [kg · m²] | Mass product of inertia with respect to x- and z-axes around blade root (blade coordinate system) |
| $I_{xz, blade}$ | [kg · m²] | Blade mass product of inertia with respect to x- and z-axes around blade root (blade coordinate system) |
| $I_{yy}$ | [kg · m²] | Mass moment of inertia in y-direction around blade root (blade coordinate system) |
| $I_{yy, blade}$ | [kg · m²] | Blade mass moment of inertia in y-direction around blade root (blade coordinate system) |
| $I_{yz}$ | [kg · m²] | Mass product of inertia with respect to y- and z-axes around blade root (blade coordinate system) |
| $I_{yz, blade}$ | [kg · m²] | Blade mass product of inertia with respect to y- and z-axes around blade root (blade coordinate system) |
| $I_{zz}$ | [kg · m²] | Mass moment of inertia in z-direction around blade root (blade coordinate system) |
| $I_{zz, blade}$ | [kg · m²] | Blade mass moment of inertia in z-direction around blade root (blade coordinate system) |
| $I'_{xx}$ | [kg · m] | Distribution of mass moment of inertia in x-direction around blade root (blade coordinate system) |
| $I'_{xy}$ | [kg · m] | Distribution of mass product of inertia with respect to x- and y-axes around blade root (blade coordinate system) |
| $I'_{xz}$ | [kg · m] | Distribution of mass product of inertia with respect to x- and z-axes around blade root (blade coordinate system) |
| $I'_{yy}$ | [kg · m] | Distribution of mass moment of inertia in y-direction around blade root (blade coordinate system) |
| $I'_{yz}$ | [kg · m] | Distribution of mass product of inertia with respect to y- and z-axes around blade root (blade coordinate system) |
| $I'_{zz}$ | [kg · m] | Distribution of mass moment of inertia in z-direction around blade root (blade coordinate system) |
| $j$ | [-] | Sample number |
| $k_F$ | [-] | Correction factor for aerodynamic force |

-continued

| Symbol | Unit | Description |
|---|---|---|
| $k_M$ | [-] | Correction factor for aerodynamic moment |
| m | [kg] | Mass |
| m' | [kg/m] | Mass distribution |
| $m_{x,i}$ | [Nm] | Relative moment in x-direction for sensor i |
| $m_{y,i}$ | [Nm] | Relative moment in y-direction for sensor i |
| $M_{Ox, b.s., inertia}$ | [Nm] | Inertia bending moment in x-direction around fixed point in rotor centre (blade coordinate system) |
| $M_{Oy, b.s., inertia}$ | [Nm] | Inertia bending moment in y-direction around fixed point in rotor centre (blade coordinate system) |
| $M_{x, b.b.s., aero.}$ | [Nm] | Aerodynamic bending moment in x-direction (blade bearing coordinate system) |
| $M_{x, b.s.}$ | [Nm] | Bending moment in x-direction (blade coordinate system) |
| $M_{x, b.s., aero.}$ | [Nm] | Aerodynamic bending moment in x-direction (blade coordinate system) |
| $M_{x, b.s., inertia}$ | [Nm] | Inertia bending moment in x-direction (blade coordinate system) |
| $M_{x, b.s., grav.}$ | [Nm] | Gravitational bending moment in x-direction (blade coordinate system) |
| $M_{x, p.s.}$ | [Nm] | Bending moment in x-direction (profile coordinate system) |
| $M_{y, b.b.s., aero.}$ | [Nm] | Aerodynamic bending moment in y-direction (blade bearing coordinate system) |
| $M_{y, b.s.}$ | [Nm] | Bending moment in y-direction (blade coordinate system) |
| $M_{y, b.s., aero.}$ | [Nm] | Aerodynamic bending moment in y-direction (blade coordinate system) |
| $M_{y, b.s., inertia}$ | [Nm] | Inertia bending moment in y-direction (blade coordinate system) |
| $M_{y, b.s., grav.}$ | [Nm] | Gravitational bending moment in y-direction (blade coordinate system) |
| $M_{y, p.s.}$ | [Nm] | Bending moment in y-direction (profile coordinate system) |
| $M_{x, friction}$ | [Nm] | Friction torque of drive train (only mechanic losses) |
| $M_{x, rotor, aero.}$ | [Nm] | Aerodynamic rotor torque in y-direction (rotor coordinate system) |
| n | [-] | Total number of samples that has passed the filtration |
| $n_{min, i}$ | [-] | Minimum number of samples that has passed the filtration needed for calibration for sensor i |
| $n_{gear}$ | [-] | Gear ratio |
| p | [-] | Exponent for distribution of aerodynamic force |
| r | [m] | Representative radius for aerodynamic forces (= distance from rotor centre) |
| $r^2$ | [-] | Square of sample correlation coefficient (= coefficient of determination) |
| $r_{hub}$ | [m] | Hub radius (= distance from rotor centre to blade root) |
| $r_{tip}$ | [m] | Tip radius (= distance from rotor centre to blade tip) |
| $r_{sensor}$ | [m] | Sensor radius (= distance from rotor centre to sensor position) |
| $R_{x,i}$ | $[(Nm)^{-1}]$ | Relative strain in x-direction for sensor i |
| $R_{y,i}$ | $[(Nm)^{-1}]$ | Relative strain in y-direction for sensor i |
| $S_{expected, i}$ | [-] | Expected sample standard deviation of strain at ith sensor position |
| $S_i$ | [-] | Sample standard deviation of strain at ith sensor position |
| $S_x$ | [kg · m] | Static moment ($1^{st}$ mass moment of inertia) in x-direction |
| $S_y$ | [kg · m] | Static moment ($1^{st}$ mass moment of inertia) in y-direction |
| $S_z$ | [kg · m] | Static moment ($1^{st}$ mass moment of inertia) in z-direction |
| t | [m] | Absolute profile thickness |
| $V_{rel.}$ | [m] | Relative wind speed on the blade at a given radial distance from rotor centre |
| X | [m] | x-coordinate (blade coordinate system) |
| $X_{c.g.}$ | [m] | x-coordinate of cross sectional centre of gravity (blade coordinate system) |
| $X_{e.c.}$ | [m] | x-coordinate of elastic center position (blade coordinate system) |
| $X_{sensor, i}$ | [m] | x-coordinate of ith sensor position (blade coordinate system) |
| y | [m] | y-coordinate (blade coordinate system) |
| $y_{c.g.}$ | [m] | y-coordinate of cross sectional centre of gravity (blade coordinate system) |
| $y_{e.c.}$ | [m] | y-coordinate of elastic center position (blade coordinate system) |
| $y_{sensor, i}$ | [m] | y-coordinate of ith sensor position (blade coordinate system) |
| Z | [m] | z-coordinate (blade coordinate system) |
| $Z_{sensor}$ | [m] | z-coordinate of sensor position (blade coordinate system) |
| $Z_{tip}$ | [m] | z-coordinate of blade tip (blade coordinate system) |
| $\gamma$ | [rad] | Cone angle |
| $\epsilon_i$ | [-] | Strain at $i^{th}$ sensor position |
| $\epsilon_{i,j}$ | [-] | Strain at $i^{th}$ sensor position and $j^{th}$ sample |
| $\bar{\epsilon}_i$ | [-] | Sample mean of strain at $i^{th}$ sensor position |
| $\theta$ | [rad] | Pitch angle |
| $\dot{\theta}$ | [rad/s] | Pitch rate |
| $\ddot{\theta}$ | [rad/s$^2$] | Pitch acceleration |
| $\theta_{aero.}$ | [rad] | Angle between blade coordinate system and direction of aerodynamic force |
| $\theta_i$ | [rad] | Pitch angle for the $i^{th}$ blade |

-continued

| Symbol | Unit | Description |
|---|---|---|
| $\rho$ | [kg/m$^3$] | Mass density of blade material |
| $\sigma_{Mx}$ | [Nm] | Standard error of the estimated $M_x$ |
| $\sigma_{My}$ | [Nm] | Standard error of the estimated $M_y$ |
| $\tau$ | [rad] | Tilt angle |
| $\phi$ | [rad] | Angle between blade coordinate system and principal bending axes |
| $\psi$ | [rad] | Azimuth angle |
| $\omega$ | [rad/s] | Rotor speed |
| $\omega_{nom.}$ | [rad/s] | Nominal rotor speed |
| $\omega_x$ | [rad/s] | Angular velocity in x-direction (blade coordinate system) |
| $\omega_y$ | [rad/s] | Angular velocity in y-direction (blade coordinate system) |
| $\omega_z$ | [rad/s] | Angular velocity in z-direction (blade coordinate system) |
| $\dot{\omega}$ | [rad/s$^2$] | Rotor acceleration |
| $\dot{\omega}_x$ | [rad/s$^2$] | Angular acceleration in x-direction (blade coordinate system) |
| $\dot{\omega}_y$ | [rad/s$^2$] | Angular acceleration in y-direction (blade coordinate system) |
| $\dot{\omega}_z$ | [rad/s$^2$] | Angular acceleration in z-direction (blade coordinate system) |

The invention claimed is:

1. A method of in situ calibrating load sensors of a horizontal axis wind turbine, the wind turbine comprising:
   a rotor including a hub and a plurality of wind turbine blades, which extend radially from the hub, the hub being connected to a drive train including a generator, which converts mechanical rotational motion of the rotor into electrical energy, wherein
   said plurality of blades comprises at least a first wind turbine blade provided with a plurality of first load sensors positioned in a first cross-section of the first wind turbine blade, and wherein
the method comprises the steps of:
   a) determining a rotor azimuth angle of the first wind turbine blade,
   b) determining a pitch angle of the first wind turbine blade,
   c) measuring loads in the first cross-section of the first wind turbine blade using the first load sensors,
   d) calculating theoretical loads based on at least the rotor azimuth angle and the pitch angle of the blade determined in steps a) and b),
   e) comparing the loads measured in step c) with the theoretical loads calculated in step d), and
   f) calibrating the first load sensors based on the comparison of step e), wherein the calibration are based only on measurements carried out during normal use of the wind turbine, when the generator is cut out, and wherein values collected in steps a)-d) are repeatedly sampled and calculated for each sample;
   wherein the rotor azimuth angle and the pitch angle are continuously sampled; and
   wherein the rotor azimuth angle and the pitch angle may change values between subsequent determinations.

2. A method according to claim 1, wherein values determined in steps a)-d) and optionally step e) are repeatedly sampled, and wherein step f) is carried out after a predetermined period of time or after a predetermined number of distinct samples have been logged, alternatively that a number of distinct samples exceeds a minimum threshold value, which is determined by a function depending on sampling frequency and spread of data.

3. A method according to claim 2, wherein the wind turbine further comprises brakes for braking rotation of the rotor, and wherein only measurements carried out when the brakes are not engaged are used for calibrating the load sensors.

4. A method according to claim 1, wherein the first cross-section further comprises at least two load sensors including a first load sensor and a second load sensor.

5. A method according to claim 4, wherein the first load sensor is located near a trailing edge of the first wind turbine blade, and the second load sensor is located between a leading edge and the trailing edge of the first wind turbine at a suction side or a pressure side of the first wind turbine blade.

6. A method according to claim 1, wherein the first wind turbine blade further is provided with a plurality of second load sensors positioned in a second cross-section of the first wind turbine blade.

7. A method according to claim 1, wherein the calculations of step d) are based on gravitational forces and/or gravitational moments from an own weight of the first wind turbine blade.

8. A method according to claim 7, wherein the calculations of step d) are further based on inertia forces and/or inertia moments from rotation of the rotor.

9. A method according to claim 7, wherein the calculations of step d) are further based on aerodynamic forces and/or aerodynamic moments from rotation of the rotor and/or from wind impacting the first wind turbine blade.

10. A method according to claim 1, wherein the calculations of step d) are further based on general properties of the first wind turbine blade and a part of the first wind turbine blade located at outboard of the first cross-section, wherein the general properties are based on one or more of the following parameters: mass, mass moment, moment of inertia and product of inertia.

11. A method according to claim 1, wherein the calculations of step d) are further based on frictional losses from the drive train.

12. A method according to claim 1, wherein measurement data obtained when a rotor speed of the rotor exceeds a generator cut-in speed are discarded from the calibration process, and/or measurement data obtained when an absolute rotor speed of the rotor is lower than a minimum rotor speed threshold are discarded from the calibration process.

13. A method according to claim 1, wherein measurement data obtained when a rotor deceleration of the rotor exceeds a rotor deceleration threshold are discarded from the calibration process.

14. A method according to claim 1, wherein measurement data obtained when the pitch of the first wind turbine blade is higher than a maximum pitch threshold are discarded from the calibration process, and/or measurement data obtained when the pitch of the first wind turbine blade is lower than a minimum pitch threshold are discarded from the calibration process.

15. A method according to claim 1, wherein the calibration process is based on data fitting.

16. A method according to claim 15, wherein the data fitting is curve fitting.

17. A method according to claim 15, wherein the data fitting is plane fitting.

18. A method of in situ calibrating load sensors of a horizontal axis wind turbine, the wind turbine comprising:
- a rotor including a hub and a plurality of wind turbine blades, which extend radially from the hub, the hub being connected to a drive train including a generator, which converts mechanical rotational motion of the rotor into electrical energy, wherein
- said plurality of blades comprises at least a first wind turbine blade provided with a plurality of first load sensors positioned in a first cross-section of the first wind turbine blade, and wherein the method comprises the steps of:
- a) determining a rotor azimuth angle of the first wind turbine blade,
- b) determining a pitch angle of the first wind turbine blade,
- c) measuring loads in the first cross-section of the first wind turbine blade using the first load sensors,
- d) calculating theoretical loads based on at least the rotor azimuth angle and the pitch angle of the blade determined in steps a) and b),
- e) comparing the loads measured in step c) with the theoretical loads calculated in step d), and
- f) calibrating the first load sensors based on the comparison of step e), wherein the calibration are based only on measurements carried out, when the generator is cut out, wherein values collected in steps a)-d) are repeatedly sampled and calculated for each sample;

wherein values determined in steps a)-e) are repeatedly sampled; and wherein step f) is carried out after a predetermined number of distinct samples have been logged, alternatively that a number of distinct samples exceeds a minimum threshold value, which is determined by a function depending on sampling frequency and spread of data;

wherein the rotor azimuth angle and the pitch angle are continuously sampled; and wherein the rotor azimuth angle and the pitch angle may change values between subsequent determinations.

* * * * *